US007926811B2

(12) United States Patent
Abe

(10) Patent No.: US 7,926,811 B2
(45) Date of Patent: Apr. 19, 2011

(54) GAMING MACHINE ACCEPTING SIDE BET AND CONTROL METHOD THEREOF

(75) Inventor: Fumiya Abe, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 98 days.

(21) Appl. No.: 12/266,221

(22) Filed: Nov. 6, 2008

(65) Prior Publication Data

US 2009/0215524 A1 Aug. 27, 2009

Related U.S. Application Data

(60) Provisional application No. 61/031,197, filed on Feb. 25, 2008.

(51) Int. Cl.
*A63F 9/24* (2006.01)
*A63F 13/00* (2006.01)
*G06F 17/00* (2006.01)
*G06F 19/00463* (2006.01)

(52) U.S. Cl. ................. 273/274; 273/138.1; 273/142 R; 273/146; 273/292; 463/17

(58) Field of Classification Search ..................... 463/22
See application file for complete search history.

(56) References Cited

U.S. PATENT DOCUMENTS 5,413,351 A 5/1995 Franklin
5,540,442 A * 7/1996 Orselli et al. .................. 463/17
5,964,463 A * 10/1999 Moore, Jr. ..................... 273/274
6,059,659 A * 5/2000 Busch et al. .................... 463/17
6,164,647 A * 12/2000 Chee ......................... 273/142 R
6,176,489 B1 * 1/2001 Astaneha ...................... 273/274
6,217,022 B1 * 4/2001 Astaneha ................... 273/138.1
6,406,022 B1 * 6/2002 Nadibaidze ................... 273/274
6,520,503 B1 * 2/2003 Porto ............................ 273/274
6,746,328 B2 * 6/2004 Cannon et al. .................. 463/17
7,255,348 B1 * 8/2007 Shaffer ......................... 273/243
7,364,507 B2 * 4/2008 Baerlocher et al. ............. 463/25
7,377,513 B2 * 5/2008 Friedman ...................... 273/274
2002/0090988 A1 * 7/2002 Frost et al. ...................... 463/17
2006/0049578 A1 * 3/2006 Chen et al. .................... 273/146
2006/0244218 A1 * 11/2006 Frankel et al. ................ 273/292
2007/0013127 A1 * 1/2007 Ellis ............................. 273/146
2007/0026947 A1 2/2007 Chun
2008/0054560 A1 * 3/2008 Presley et al. .............. 273/138.2
2008/0061505 A1 * 3/2008 Snow ........................... 273/274
2008/0099991 A1 * 5/2008 Snow et al. .................. 273/272
2008/0161101 A1 * 7/2008 Lutnick et al. .................. 463/25
2008/0203663 A1 * 8/2008 Pirouzkhah et al. .......... 273/274

FOREIGN PATENT DOCUMENTS

WO WO 2007/016776 A1 2/2007

* cited by examiner

*Primary Examiner* — Paul A. D'Agostino
(74) *Attorney, Agent, or Firm* — NDQ&M Watchstone LLP

(57) ABSTRACT

A gaming machine of the present invention comprises: a controller programmed so as to execute the following processing of: (A) accepting from an input device an input indicating placement of a normal BET on outcome of dice; (B) accepting from the input device an input indicating placement of a side BET on colors of regions to which stopped dice belong; (C) rolling and stopping the dice in a gaming region which includes a plurality of regions each having a different color from one another; (D) offering a normal payout based upon the outcome of the dice stopped in the processing (C) and the normal BET placed in the processing (A); and (E) offering an additional payout based upon the colors of the regions to which the dice stopped in the processing (C) belong and the side BET placed in the processing (B).

6 Claims, 18 Drawing Sheets

| Color combination | Number of game media BET as normal BET | | | | |
|---|---|---|---|---|---|
| | 5~9 | 10~29 | 30~59 | 60~99 | 100~ |
| Yellow, Yellow, Yellow | 5 | 8 | 10 | 15 | 20 |
| Yellow, Yellow, Blue | 2 | 3 | 8 | 10 | 15 |
| Yellow, Yellow, Red | 3 | 5 | 5 | 8 | 10 |
| · | · | · | · | · | · |
| Yellow, Blue, Red | 2 | 3 | 5 | 8 | 10 |
| · | · | · | · | · | · |
| Blue, Blue, Blue | 10 | 20 | 30 | 50 | 80 |
| ·<br>· | ·<br>· | ·<br>· | ·<br>· | ·<br>· | ·<br>· |
| Red, Red, Red | 3 times(※) | 5 times(※) | 8 times(※) | 10 times(※) | 20 times(※) |

※Execution of free games in number set according to the number of game media BET as normal BET

Fig. 2

| Color combination | Number of game media BET as normal BET | | | | |
|---|---|---|---|---|---|
| | 5～9 | 10～29 | 30～59 | 60～99 | 100～ |
| Yellow, Yellow, Yellow | 5 | 8 | 10 | 15 | 20 |
| Yellow, Yellow, Blue | 2 | 3 | 8 | 10 | 15 |
| Yellow, Yellow, Red | 3 | 5 | 5 | 8 | 10 |
| · | · | · | · | · | · |
| Yellow, Blue, Red | 2 | 3 | 5 | 8 | 10 |
| · | · | · | · | · | · |
| Blue, Blue, Blue | 10 | 20 | 30 | 50 | 80 |
| ·<br>· | ·<br>· | ·<br>· | ·<br>· | ·<br>· | ·<br>· |
| Red, Red, Red | 3 times (※) | 5 times (※) | 8 times (※) | 10 times (※) | 20 times (※) |

※Execution of free games in number set according to the number of game media BET as normal BET

GAMING MACHINE ACCEPTING SIDE BET AND CONTROL METHOD THEREOF

CROSS-REFERENCE TO RELATED APPLICATIONS

This application claims benefit of priority based on U.S. Provisional Patent Application No. 61/031,197 filed on Feb. 25, 2008. The contents of this application are incorporated herein by reference in their entirety.

BACKGROUND OF THE INVENTION

1. Field of the Invention

The present invention relates to a gaming machine accepting a side BET and a control method thereof.

2. Discussion of the Background

There have been conventionally known a variety of table games, and for example, as disclosed in WO 07/016,776-A1, US 2007/0026947-A1, and U.S. Pat. No. 5,413,351, a game genre called a dice game exists among those table games.

Among the dice games, there exists, for example, a gaming method in which a dealer throws dice after a player has performed a BET operation, and in the case where the dealer throws a predetermined combination, the player can throw dice to obtain a high payout, as disclosed in U.S. Pat. No. 5,413,351. Further, in Asia, Sic Bo is known as a long-time familiar dice game in which a player places a BET based on a prediction of the outcomes of three dice.

Sic Bo is widely known as an ancient Chinese dice game. In Sic Bo, a player places a BET based on a prediction of the outcomes of the respective three dice or a combination of the outcomes of the three dice. The way of placing a BET and payout rates are displayed on a table where a player is seated (or they may be displayed to an image display). The table is provided with: an area for placing a BET based on a prediction of the outcome of one die; an area for placing a BET based on a prediction that the outcomes of two dice will be the same; an area for placing a BET based on a prediction that the outcomes of the three dice will be the same; an area for placing a BET based on a prediction of a combination of the outcomes of two dice; an area for placing a BET based on a prediction of the total value of the outcomes of the three dice; and the like. As for the payout, although it cannot be uniformly set due to different circumstances of regions, countries, or the like, it has been set to the degree of 1:1 to 1:180 according to an appearance probability.

Since the dice game disclosed in U.S. Pat. No. 5,413,351 is executed according to a particular rule, there has been a problem that the game is unfamiliar to the player and lacks interesting aspects. Further, in typical Sic Bo widely known, types of BETs are limited and hence the player might soon be tired of the game.

Further, in the conventional dice games, the object of the interest of the player in the game has been limited to what are the outcomes of the dice since a payout is offered based solely upon the outcomes of the dice. Consequently, there has been a problem in that, as repeatedly playing the games, the player feels that such a game whose result is determined based only upon the outcomes of the dice is monotonous, and easily gets bored of the game.

Further, the player needs to know what are the outcomes of the dice so as to grasp whether or not the outcomes of the stopped dice are the outcomes of the dice on which he or she has placed the BET (whether or not the BET results in a win). However, a situation may occur in which the outcomes of the dice are difficult to see when the dice are small, or when the distance from the station to the dice is long, or the like. Namely, in such cases, there has been a problem in that the player cannot immediately see whether his or her BET results in a win or a loss, resulting in making it hard for the player to feel interested in the game.

An object of the present invention is to provide a gaming machine capable of enhancing interesting aspects of a game so as to prevent a player from becoming tired of the game, and a control method of the gaming machine.

The contents of WO 07/016,776-A1, US 2007/0026947-A1, and U.S. Pat. No. 5,413,351 are incorporated herein by reference in their entirety.

SUMMARY OF THE INVENTION

The present invention provides a gaming machine having the following configuration.

Namely, the gaming machine includes a gaming region, an input device and a controller. The gaming region includes a plurality of regions each having a different color from one another, and dice roll and stop in the gaming region. The input device is a device with which a normal BET can be placed on outcomes of the dice and a side BET can be placed on colors of regions to which the stopped dice belong. The controller is programmed so as to execute the following processing of:

(A) accepting from the input device an input indicating placement of the normal BET on the outcomes of the dice;

(B) accepting from the input device an input indicating placement of the side BET on the colors of the regions to which stopped dice belong;

(C) rolling and stopping the dice in the gaming region;

(D) offering a normal payout based upon the outcomes of the dice stopped in the processing (C) and the normal BET placed in the processing (A); and (E) offering an additional payout based upon the colors of the regions to which the dice stopped in the processing (C) belong and the side BET placed in the processing (B).

According to the above-mentioned gaming machine, two kinds of BETs, which are the normal BET and the side BET, can be placed. When the side BET is placed, not only the normal payout based upon the normal BET but also the additional payout based upon the side BET may be offered. It is thereby possible to increase options in BETTING so that a game in which the player hardly feels bored can be provided.

Further, according to the above-mentioned gaming machine, a gaming region where the dice stop includes a plurality of regions each having a different color from one another. Based upon the colors of the regions to which the stopped dice belong and the side BET, the additional payout is offered. In this manner, since the colors of the regions to which the stopped dice belong are involved in the payout as well as the outcomes of the dice, it is possible to make the player interested in such colors as well as the outcomes of the dice. Thereby, an increase in matters of concern for the player can reduce the possibility that the player feels the game is monotonous. It is thereby possible to provide a game in which the player hardly feels bored even when the player plays the games for a long period of time.

Moreover, the additional payout is offered based upon the colors of the regions to which the stopped dice belong. Generally, colors are easily visually recognizable by human eyes, and hence there is a high possibility that the player grasps the colors of the regions to which the stopped dice belong more easily than grasping the outcomes of the stopped dice. Consequently, the player can relatively easily recognize whether or not the additional payout is to be offered and whether the payout amount is large or small. It is thus possible to avoid a situation in which the player cannot feel interested in the game due to the difficulty of immediate recognition of whether his or her BET has resulted in a win or a loss.

Furthermore, it is possible to allow the player to visually enjoy the positional relationships between the dice that are about to stop and the gaming regions having a variety of colors, so as to also improve the interesting aspect of the game.

The above-mentioned gaming machine desirably has the following configuration.

That is, the processing (E) is processing of offering the additional payout based upon the colors of the regions to which the dice stopped in the processing (C) belong and the side BET placed in the processing (B), on condition that the input indicating placement of the normal BET on the outcomes of the dice stopped in the processing (C) has been made in the processing (A).

According to the above-mentioned gaming machine, the additional payout is offered, on condition that the input indicating placement of the normal BET on the outcomes of the stopped dice has been made, namely when the normal BET has resulted in a win. Therefore, with the win of the normal BET, the joy of the player having acquired the normal payout can be increased. It is thereby possible to provide the player with a high sense of satisfaction.

Desirably, the above-mentioned gaming machine further has the following configuration.

That is, the processing (E) is processing of offering the additional payout based upon the colors of the regions to which the dice stopped in the processing (C) belong and the side BET placed in the processing (B), on condition that the input indicating placement of the normal BET on the outcomes of the dice stopped in the processing (C) has not been made in the processing (A).

According to the above-mentioned gaming machine, the additional payout is offered, on condition that the input indicating placement of the normal BET on the outcomes of the stopped dice has not been made, namely when the normal BET has resulted in a loss. Thereby, it is possible to provide the player who may feel disappointed by the loss of the normal BET with a sense of satisfaction. Moreover, it is possible to prevent the player from being tired of the games due to continuous loss of the normal BET for a long period of time.

Desirably, the above-mentioned gaming machine further has the following configuration.

That is, the processing (E) is processing of offering the additional payout based upon an amount of game media BET in the processing (A) as the normal BET, the colors of the regions to which the dice stopped in the processing (C) belong, and the side BET placed in the processing (B).

According to the above-mentioned gaming machine, the larger the number of game media have been BET as the normal BET, the larger number of game media are paid as the additional payout. It is therefore possible to prompt the player to place the normal BET with a large number of game media, thereby benefit of a game parlor can be increased.

Further, since there is a correlation between the number of game media which have been BET as the normal BET and the number of game media that can be paid out as the additional payout, this configuration allows the player to consider how to place the BET while thinking the correlation of the both, upon placement of the normal BET and the side BET. Namely, it is possible to make the player study by trial and error such a way for placing the BET as to maximize a total of the number of game media that are paid out as the normal payout and the number of game media that are paid out as the additional payout. It is thereby possible to make the player absorbed in the games and also aware of strategic properties of the game, so as to improve the interesting aspect of the game.

Desirably, the above-mentioned gaming machine further has the following configuration.

That is, the processing (E) is processing of executing a bonus game that is a game started when the colors of the regions to which the dice stopped in the processing (C) belong satisfy a predetermined condition, and offering the additional payout based upon a game result determined in the bonus game.

According to the above-mentioned gaming machine, since a bonus game (e.g. free game) is started when the colors of the regions to which the stopped dice belong satisfy the predetermined condition, it is possible to make the player have a keen interest in that the colors of the regions to which the stopped dice belong satisfy the predetermined condition (e.g. a combination of the colors of the regions where the three dice have stopped has resulted in a combination (RED, RED, RED)). This configuration allows the player to play the game while expecting that the colors of the regions to which the stopped dice belong satisfy the predetermined condition, so as to provide a game in which the player hardly feels bored even when the player plays games for a long period of time.

Moreover, the number of game media to be paid out as the additional payout is determined based upon the result of the bonus game. Namely, the number of game media to be paid out as the additional payout is not a predetermined number, but can vary depending upon the result of the bonus game. Hence, the player can acquire a great number of game media as the additional payout depending upon the result of the bonus game. It is thereby possible to raise the expectation of the player for the additional payout.

The present invention further provides a method for controlling a gaming machine having a following configuration.

The method for controlling the gaming machine comprises the following steps of: (A) accepting from an input device an input indicating placement of a normal BET on outcome of dice; (B) accepting from the input device an input indicating placement of a side BET on colors of regions to which stopped dice belong; (C) rolling and stopping the dice in a gaming region which includes a plurality of regions each having a different color from one another; (D) offering a normal payout based upon the outcome of the dice stopped in the step (C) and the normal BET placed in the step (A); and (E) offering an additional payout based upon the colors of the regions to which the dice stopped in the step (C) belong and the side BET placed in the step (B).

According to the above-mentioned method for controlling a gaming machine, two kinds of BETs, which are the normal BET and the side BET, can be placed. When the side BET is placed, not only the normal payout based upon the normal BET but also the additional payout based upon the side BET may be offered. It is thereby possible to increase options in BETTING so that a game in which the player hardly feels bored can be provided.

Further, according to the above-mentioned method for controlling a gaming machine, a gaming region where the dice stop includes a plurality of regions each having a different color from one another. Based upon the colors of the regions to which the stopped dice belong and the side BET, the additional payout is offered. In this manner, since the colors of the regions to which the stopped dice belong are involved in the payout as well as the outcomes of the dice, it is possible to make the player interested in such colors as well as the outcomes of the dice. Thereby, an increase in matters of concern for the player can reduce the possibility that the player feels the game is monotonous. It is thereby possible to provide a game in which the player hardly feels bored even when the player plays the games for a long period of time.

Moreover, the additional payout is offered based upon the colors of the regions to which the stopped dice belong. Generally, colors are easily visually recognizable by human eyes, and hence there is a high possibility that the player grasps the colors of the regions to which the stopped dice belong more easily than grasping the outcomes of the stopped dice. Consequently, the player can relatively easily recognize whether or not the additional payout is to be offered and whether the payout amount is large or small. It is thus possible to avoid a situation in which the player cannot feel interested in the game due to the difficulty of immediate recognition of whether his or her BET has resulted in a win or a loss.

Furthermore, it is possible to allow the player to visually enjoy the positional relationships between the dice that are about to stop and the gaming regions having a variety of colors, so as to also improve the interesting aspect of the game.

BRIEF DESCRIPTION OF THE DRAWINGS

FIG. 2 is a view showing the corresponding relationships among color combinations, the numbers of game media which are BET as a normal BET, and side-game payout amounts.

DESCRIPTION OF THE EMBODIMENTS

In the following, first and second embodiments will be described as embodiments of the present invention.

Figure 1A:
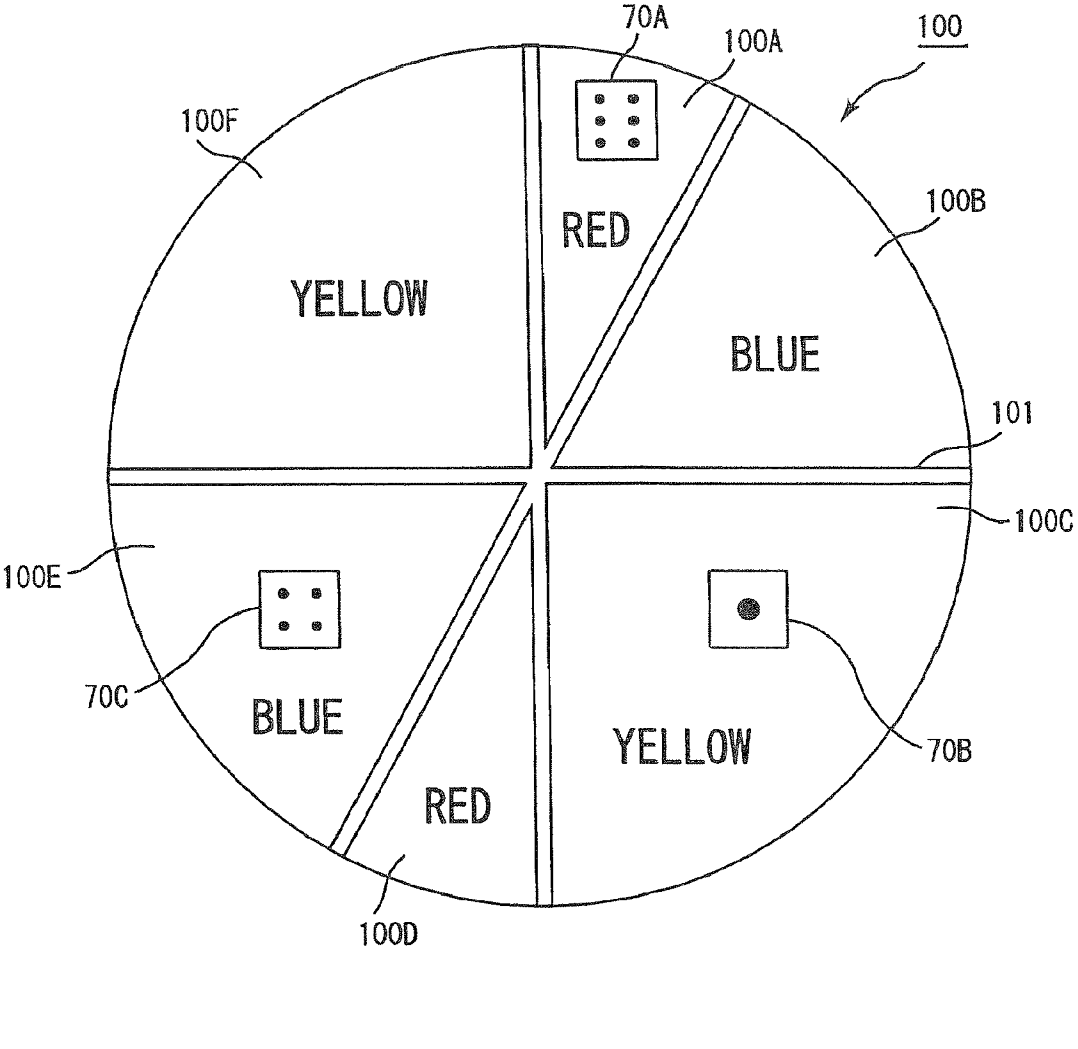
FIG. 1A is a view showing a state of stopped dice on a stopping plate.
Figure 1B:
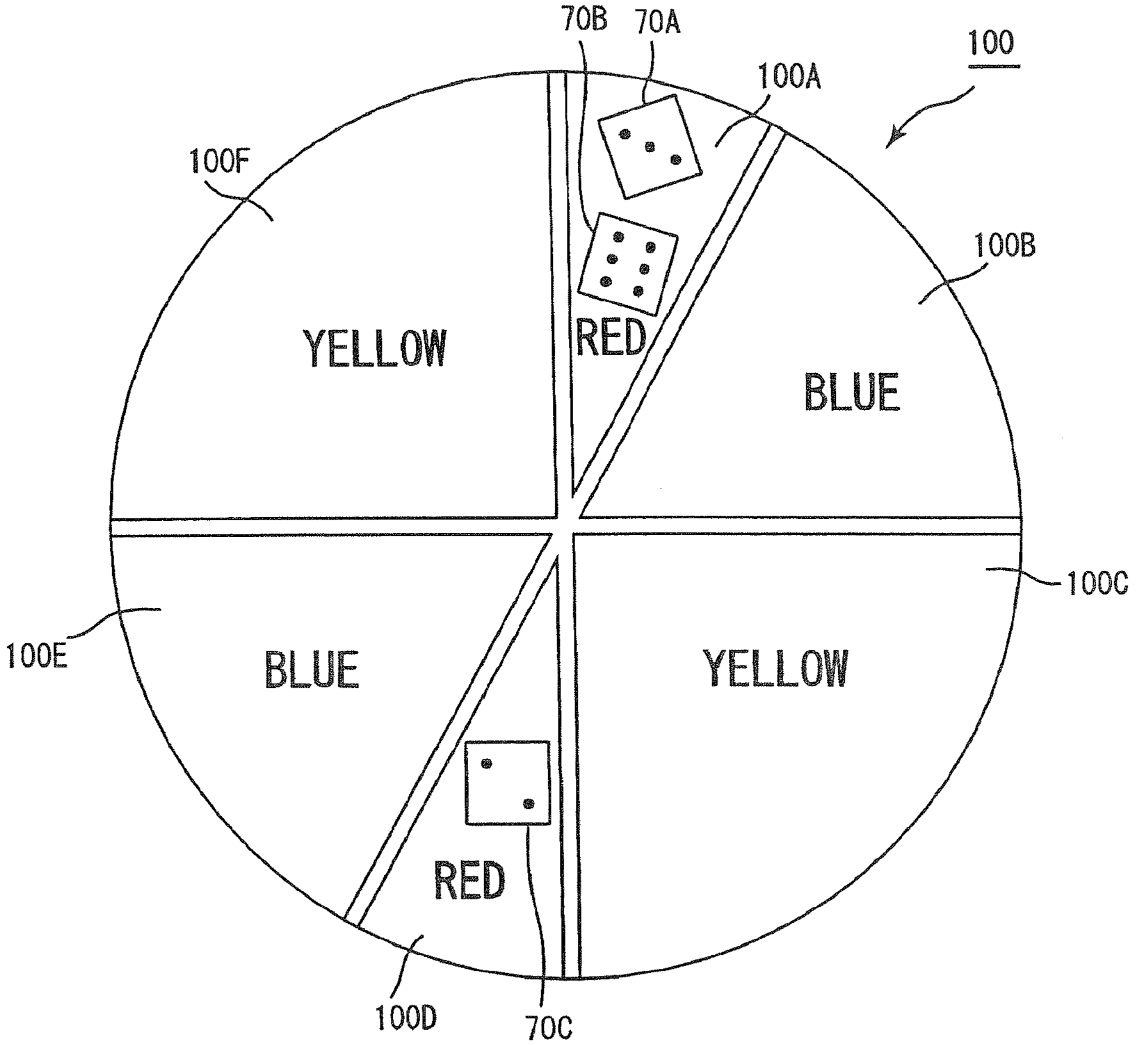
FIG. 1B is another view showing a state of stopped dice on the stopping plate.

FIGS. 1A and 1B (FIG. 1) are views each showing a state of stopped dice on a stopping plate.

FIG. 2 is a view showing the corresponding relationships among color combinations, the numbers of game media which are BET as a normal BET, and side-game payout amounts.

In a gaming machine 1 (cf. FIG. 3) according to the first embodiment and the second embodiment, three dice are used to perform a dice game (Sic Bo). A player can place a normal BET while predicting the outcomes of the dice (cf. FIG. 7). A normal payout is then offered based upon the outcomes of the dice and the normal BET. In the present specification, a payout that is offered based upon the outcomes of the dice and the normal BET are referred to as a main-game payout. Further, an amount of game media that are paid out as the main-game payout is referred to as a main-game payout amount.

Figure 4:
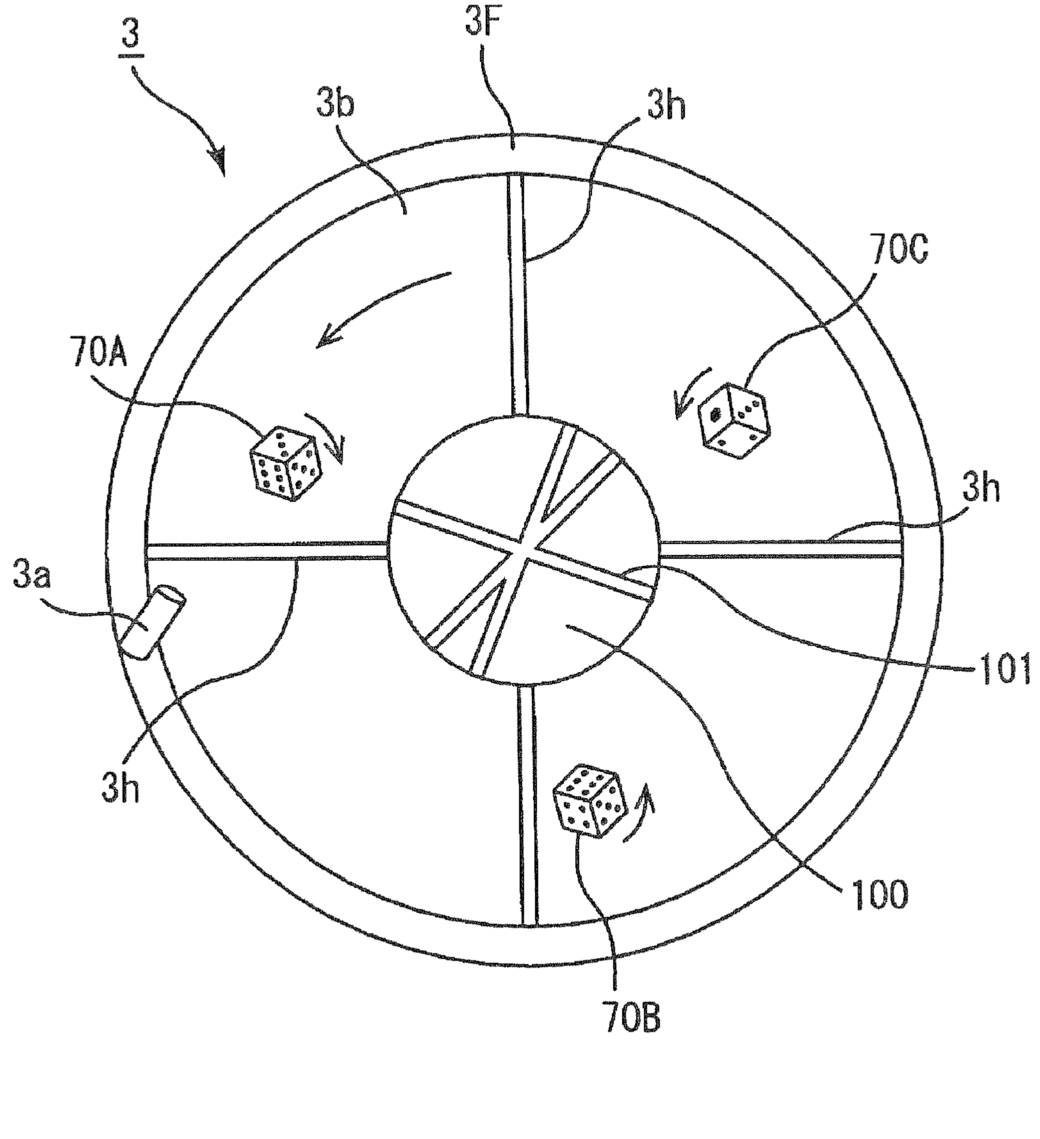
FIG. 4 is an enlarged view of a gaming portion of the gaming machine shown in FIG. 3.

The outcomes of the dice are determined in the gaming section 3 (cf. FIG. 4). The gaming section 3 includes the stopping plate 100. After rolling in the gaming section 3, the three dice stop on the stopping plate 100 (cf. FIG. 1).

As shown in FIG. 1, the stopping plates 100 include six regions, a stopping plate 100A, a stopping plate 100B, a stopping plate 100C, a stopping plate 100D, a stopping plate 100E, and a stopping plate 100F. Further, each region has a different color. Namely, the stopping plate 100A is colored red. The stopping plate 100B is colored blue. The stopping plate 100C is colored yellow. The stopping plate 100D is colored red. The stopping plate 100E is colored blue. The stopping plate 100F is colored yellow.

Although FIG. 1 show the stopping plates 100A to 100F each having any of characters "RED", "BLUE" and "YELLOW" displayed thereon, such display is only for the sake of description. Practically, each of the stopping plates 100A to 100F have a color corresponding to the characters "RED", "BLUE" and "YELLOW".

The stopping plate 100 corresponds to the gaming region in the present invention.

Further, the stopping plate 100 is provided with partition plates 101. The gaming section 3 is configured to prevent the dice from stopping on the partition plate 101 such that each of the stopped dice belongs to any one region out of the stopping plates 100A to 100F.

The player can place the side BET separately from the normal BET while predicting the color combination. Namely, the player predicts in which regions out of the stopping plates 100A to 100F the three dice will stop, and places the side BET on the combination of the colors of the regions predicted to be where the dice will stop.

The payout is then offered based upon the combination of the colors of the regions to which the three stopped dice belong (hereinafter, simply referred as the color combination) and the side BET. In the present specification, the payout that is offered based upon the color combination and the side BET is referred to as a side-game payout. Further, the number of game media that are paid out as the side-game payout is referred to as a side-game payout amount.

As shown in FIG. 2, the number of game media, to be paid out when a single game medium is placed as the side BET, is set for each color combination. Moreover, as shown in FIG. 2, the gaming machine 1 according to the first embodiment and the second embodiment is configured such that, the larger the number of game media have been BET as the normal BET, the larger number of game media are paid out as the side-game payout.

In the example shown in FIG. 1A, a die 70A has stopped on the stopping plate 100A colored red. Further, a die 70B has stopped on the stopping plate 100C colored yellow. Moreover, a die 70C has stopped on the stopping plate 100E colored blue. The color combination is a combination (RED, YELLOW, BLUE). In the case where, for example, the number of game media having been BET as the side BET is 5 and the number of game media having been BET as the normal BET is 15, the number of game media to be paid out as the side-game payout is 3×5=15.

In the example shown in FIG. 1B, the die 70A has stopped on the stopping plate 100A colored red. Further, the die 70B has stopped on the stopping plate 100A colored red. Moreover, the die 70C has stopped on the stopping plate 100D colored red. The color combination is a combination (RED, RED, RED). In this case, as shown in FIG. 2, free games are conducted in number set corresponding to the number of game media having been BET as the normal BET.

During the free games, the player can play the game without reduction in the number of credits. Specifically, the player can place the normal BET on any outcomes of the dice with the same number of game media as the number of game media having been BET as the normal BET in the normal game (normal game where the color combination has resulted in the combination (RED, RED, RED)) that has triggered generation of the free games, without reduction in number of credits. The main-game payout is then offered based upon the normal BET and the outcomes of the dice determined by the stopped dice.

In the dice games played in the present embodiments, a game other than free game is called a normal game in the present specification.

In the above, general descriptions of the first embodiment and the second embodiments has been given.

As described above, when the color combination determined by the stopped dice is not the combination (RED, RED, RED), the side-game payout is offered based upon the color combination and the side BET.

Further, when the combination of the colors determined by the stopped dice is the combination (RED, RED, RED), the free games are conducted and the main-game payout is offered.

The side-game payout and the main-game payout correspond to the additional payout in the present invention. Here, as described above, the side-game payout is offered in the case where the color combination is not the combination (RED, RED, RED) and the main-game payout is offered in the free games played in the case where the color combination is the combination (RED, RED, RED).

On the other hand, the main-game payout that is offered in the normal game corresponds to the normal payout in the present invention.

First Embodiment

In the first embodiment, the side-game payout is offered, on condition that the normal BET has been placed on the outcomes of the dice determined by the stopped dice, namely that the main-game payout amount is not 0 (the result of the main game is a win).

Hereinafter, the first embodiment will be described in detail with reference to FIGS. 3 to 16.

Figure 3:
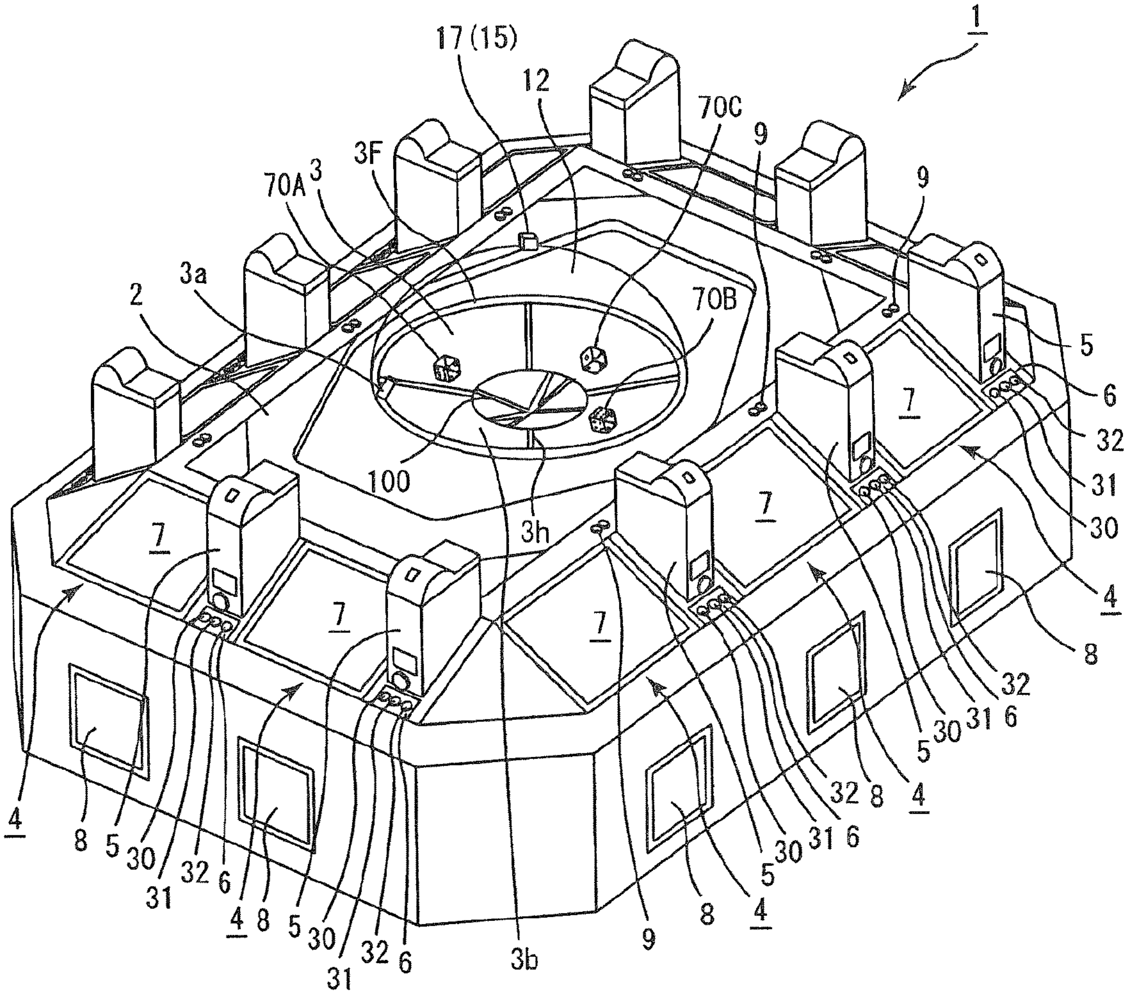
FIG. 3 is a perspective view schematically showing one example of a gaming machine according to the present invention.

FIG. 3 is the perspective view schematically showing one example of the gaming machines according to the present invention.

FIG. 4 is an enlarged view showing the gaming portion of the gaming machine shown in FIG. 3.

Figure 5:
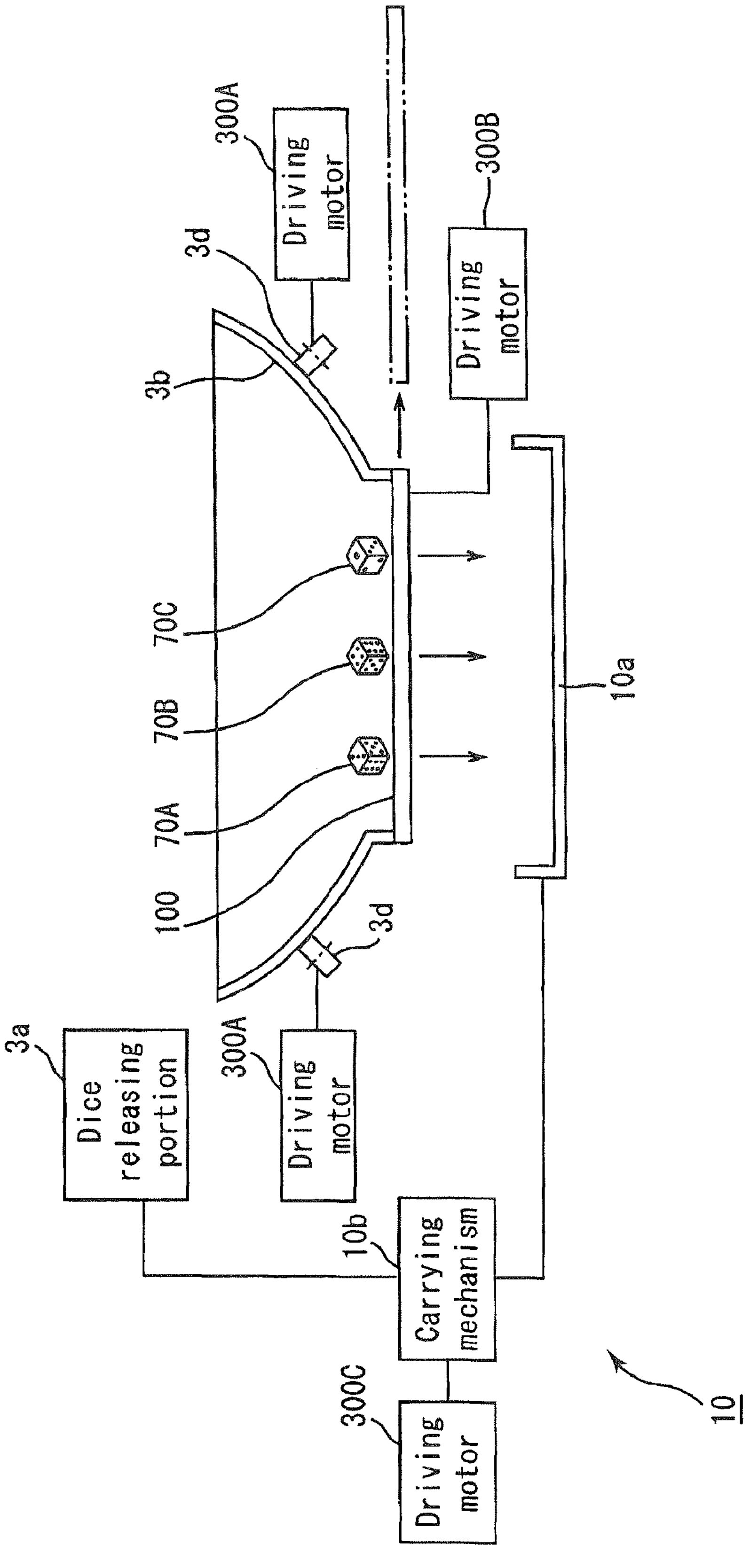
FIG. 5 is a view schematically showing a channel from collection to release of dice in the gaming portion.

FIG. 5 is a view schematically showing a channel from collection to release of the dice in the gaming portion.

As shown in FIG. 3, the gaming machine of the present embodiment includes a cabinet 2 serving as a main body portion, a gaming portion 3 in which a plurality of dice 70 roll and stop, disposed almost at the center of the upper surface of the cabinet 2, and a plurality of stations 4 disposed so as to surround the gaming portion 3. Each of the stations 4 includes an image display 7. A player seated at each of the stations takes part in a game by inputting a normal BET and a side BET based on a prediction of the outcomes of the dice 70.

The gaming machine 1 includes: the cabinet 2 to be the main body portion; the gaming portion 3 which is provided at the substantially central portion of the upper surface of the cabinet 2 and in which the plurality of the dice 70 roll and stop; and the plurality of (10 units in the present embodiment) the stations 4 provided so as to surround the gaming portion 3.

Each of the stations 4 includes: a game media accepting device 5 into which game media such as medals for use in a game are inserted; a control portion 6 having a plurality of control buttons and the like, with which a player inputs predetermined commands; and the image display 7 to which an image regarding a BET table and the like are displayed. The player can participate in a game by operating the control portion 6 while watching the image displayed to the image display 7.

On the side surfaces of the cabinet 2 where the stations 4 are installed, there are provided for each station 4 a payout exit 8 from which the game media are paid out. Further, on the right side above the image display 7 of each station 4, speakers 9 capable of outputting a sound are provided.

The control portion 6 is provided beside the image display 7 of the station 4. In the control portion 6, a confirmation button 30, a payback button 31 and a help button 32 are arranged in the order from the left, when seen from a position facing to the station 4.

The confirmation button 30 is pressed when a BET operation is confirmed after the BET operation has been performed. Further, for operations other than the BET operations, the player also presses the confirmation button 30 to confirm an input that the player has entered.

The payback button 31 is typically pressed after a game has been ended. When the payback button 31 is pressed, game media according to credits owned by the player is paid back from the payout exit 8.

The help button 32 is pressed when the game playing manner or the like is unclear. Immediately after the help button 32 is pressed, a help image showing information on a variety of operations is displayed to the image display 7.

In the gaming portion 3, the plurality of the dice 70 are rolled and stopped. In the present embodiment, the gaming machine 1 has a configuration in which three dice 70 (a die 70A, a die 70B and a die 70C) are used in the gaming portion 3.

The gaming portion 3 is formed in a circular shape and includes: a dice releasing portion 3*a* from which the dice 70 are released; a rotating plate 3*b* that rotates the dice 70 sequentially released from the dice releasing portion 3*a*; and a stopping plate 100 that finally stops the dice 70 rotating on the rotating plate 3*b*. As described above, the stopping plate 100 is provided with the partition plates 101. The partition plate 101 is capable of preventing the die from stopping on the boundary portion of the adjacent regions out of the stopping plates 100A to 100F constituting the stopping plate 100.

The dice releasing portion 3*a* is installed in a circular outer frame 3F configuring the gaming portion 3, and from here, the dice 70A to 70C are sequentially (or simultaneously) released toward the rotating plate 3*b*. It is to be noted that in FIGS. 3 and 4, the dice 70 are drawn in a large size as compared with the dice releasing portion 3*a* for the sake of facilitating the description.

The rotating plate 3*b* has a shape of a truncated cone, as shown in FIG. 4. On the lower surface portion of the rotating plate 3*b*, a plurality of driving rollers 3*d* are rotatably provided in a state in contact with the rotating plate 3*b*. Simultaneously with start of a game, the plurality of the rotating rollers 3*d* are rotationally driven by a rotating-plate driving motor 300A, to rotationally drive the rotating plate 3*b*. It is to be noted that on the front surface of the rotating plate 3*b*, projections 3*h* are provided at predetermined intervals, which flip the respective dice so as to facilitate rolling thereof when the rotating plate 3*b* is rotationally driven.

The stopping plate 100 is configured in a circular plate shape at the bottom portion of the rotating plate 3*b* having a shape of a truncated cone, and is an area where the dice 70 rotating on the rotating plate 3*b* finally stop after dropping along the inclination of the rotating plate 3*b* following the stop of the rotating plate 3*b*. Namely, the dice 70 released from the dice releasing portion 3*a* rotate on the surface of the rotating plate 3*b* by rotation of the rotating plate 3*b*, and drop along the inclination of the rotating plate 3*b* with the stop of the rotating plate 3*b*. Then, the dice 70 finally stop on the stopping plate 100.

As shown in FIG. 5, the stopping plate 100 is configured to be slidingly driven by a stopping-plate driving motor 300B. With the stopping plate 100 slidingly driven, the dice 70 drop toward a collection/release mechanism 10.

The collection/release mechanism 10 includes: a housing portion 10*a* that receives the dice 70 having dropped from the stopping plate 100; a carrying mechanism 10*b* that carries the dice 70 inside the housing portion 10*a* toward the dice releasing portion 3*a*; and a carriage driving motor 300C that drives the carrying mechanism 10*b*. The configuration of the collection/release mechanism 10 is not limited to a specific form, so long as it is a configuration capable of collecting the dice 70 after a later-described outcome detecting device 15 has completed detection of the outcomes of the respective dice 70 having stopped on the stopping plate 100, and releasing the dice 70 from the dice releasing portion 3*a*, toward the rotating plate 3*b*. Namely, for example, the carrying mechanism 10*b* can be conducted in a variety of forms, such as a configuration in which the carrying mechanism 10*b* carries the dice 70 by air pressure from the housing portion 10*a* toward the dice releasing portion 3*a*, and a configuration in which the carrying mechanism 10*b* carries the dice 70 by a conveyor-like carrier from the housing portion 10*a* toward the dice releasing portion 3*a*.

The gaming portion 3 is covered at its whole upper portion by a hemispheric covering member 12 made of transparent acrylic, and therefore the rotating range of the dice 70 is regulated. In the present embodiment, the outcome detecting device 15 that detects the outcomes of the dice 70 is installed on the top of the covering member 12. It is to be noted that in FIG. 3, the covering member 12 is drawn so as to cover only part of the gaming portion 3 for the sake of facilitating the description.

Figure 6:
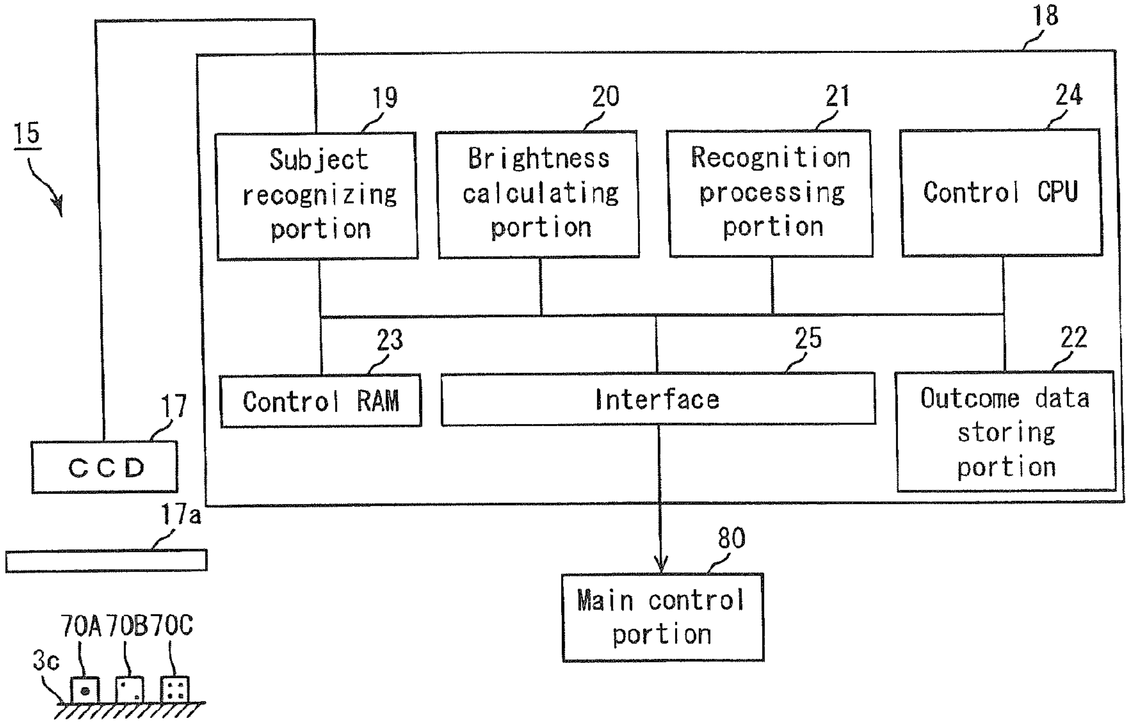
FIG. 6 is a block diagram showing an internal configuration of an outcome detecting device in the gaming machine shown in FIG. 3.

FIG. 6 is a block diagram showing an internal configuration of the outcome detecting device in the gaming machine shown in FIG. 3.

The outcome detecting device 15 in the present embodiment includes an imaging device (CCD camera) 17 and an outcome detecting circuit 18. The imaging device 17 is capable of photographing the dice 70 and the stopping plate 100 that are photographing subjects. Further, the outcome detecting circuit 18 is capable of processing an imaging signal from the imaging device 17 and detecting the outcomes of the dice 70 and colors of the stopping plate 100 (stopping plates 100A to 100F) where the dice have stopped.

The imaging device 17 is previously made by a focus lens 17*a* to have a focus consistent with the stopping plate 100 in order to photograph the dice 70 stopped on the stopping plate 100 and the stopping plate (the stopping plates 100A to 100F), and is exposure-controlled. The outcome detecting circuit 18 includes: a subject recognizing portion 19 that receives an imaging signal from the imaging device 17 to recognize positions of subjects (the dice 70 and stopping plate 100); a brightness calculating portion 20 that calculates brightness of the image of the subjects (image of the dice and the stopping plate 100) recognized in the subject recognizing portion 19; a recognition processing portion 21 that identifies the outcomes of the dice 70 and the colors of the stopping plates 100 (the stopping plates 100A to 100F) where the dice have stopped; an outcome data storing portion 22 in which comparison data regarding the outcomes of the dice 70 is stored; a control RAM 23; and a control CPU 24 that controls these units. These units are connected to one another through a bus, and controlled by the control CPU 24.

From the imaging signal of the dice 70 and the stopping plate 100 where the dice have stopped received from the imaging device 17, intensity distribution of the image is measured in the subject recognizing portion 19. Measuring the intensity distribution allows identification of the positions of the dice 70 on the stopping plate 100 and the surface states of the dice 70. Further, the brightness is calculated by the brightness calculating portion 20, to identify the colors of the stopping plate 100 (the stopping plates 100A to 100F) where the dice have stopped. In the recognition processing portion 21, the identified data is subjected to processing of comparison with the comparison data previously stored in the outcome data storing portion 22, to identify the outcomes of the dice 70.

The outcome information indicating the identified outcomes and the color information indicating the identified colors are stored into the control RAM 23, and transmitted to a later-described main control portion 80 through an interface 25. Namely, the outcome detecting device 15 identifies the outcomes of the three dice 70 having stopped in the gaming portion 3 and the colors of the stopping plate 100 (stopping plates 100A to 100F) where the dice have stopped, and transmits the outcome information indicating the identified outcomes and the color information indicating the identified colors to the main control portion 80.

Figure 7:
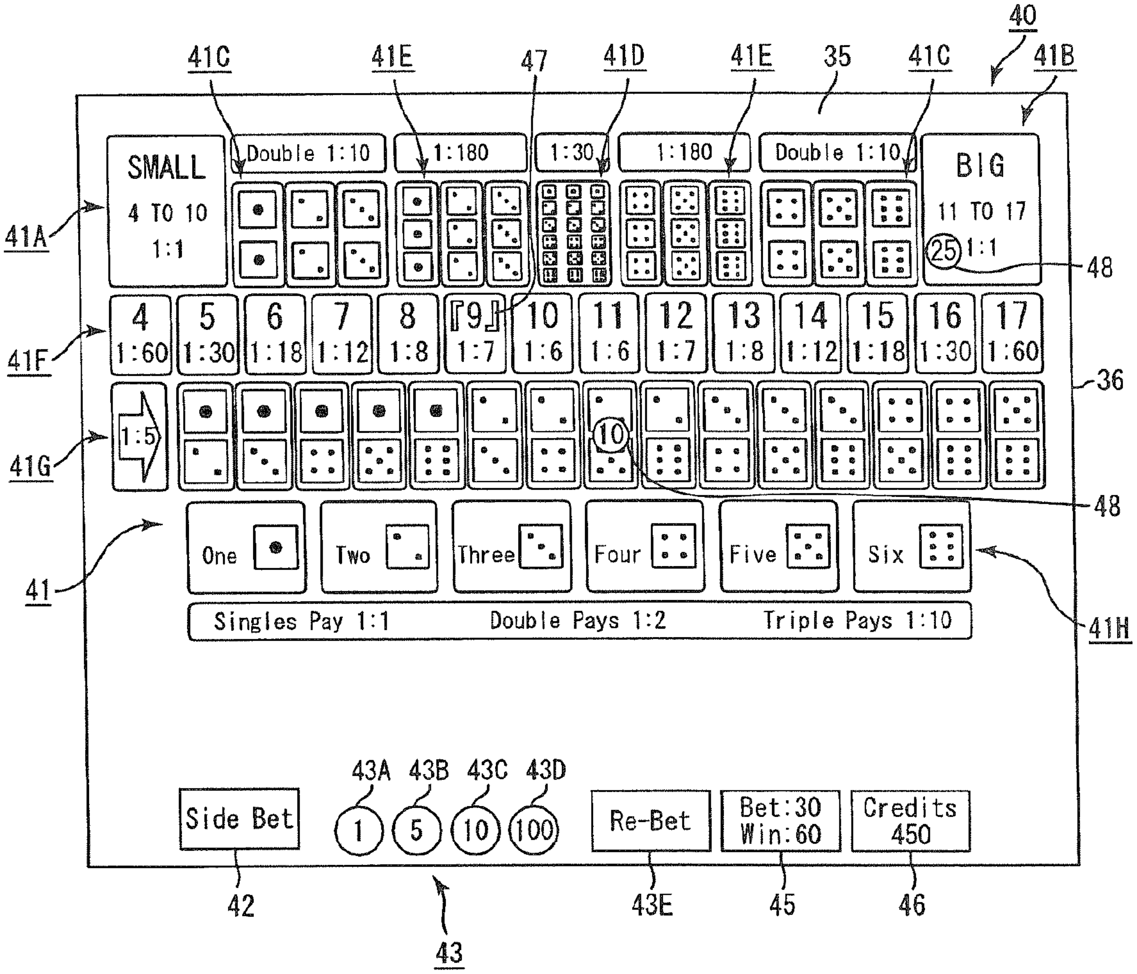
FIG. 7 is an exemplary view showing a display screen displayed to the image display.

FIG. 7 is an exemplary view showing the display screen displayed to the image display.

As shown in FIG. 7, the image display 7 is a touch-panel-type liquid crystal display having a touch panel 35 installed on its front surface; the player can select an icon and the like displayed to the liquid crystal screen 36 by touching the touch panel 35 with his/her finger or the like. The touch panel 35 corresponds to the input device in the present invention.

During the game, a table-type betting board (normal BET screen) 40 to be used for predicting the outcomes of the dice 70 is displayed at a predetermined timing.

The following describes the normal BET screen 40 in more detail.

On the normal BET screen 40, a plurality of normal BET areas 41 (normal BET area 41A, normal BET area 41B, normal BET area 41C, normal BET area 41D, normal BET area 41E, normal BET area 41F, normal BET area 41G, normal BET area 41H) and a side BET button 42 are displayed. A normal BET operation is performed by touching the touch panel 35 with a finger or the like to specify the normal BET area 41, and making chips displayed on the specified normal BET area 41.

Figure 8A:
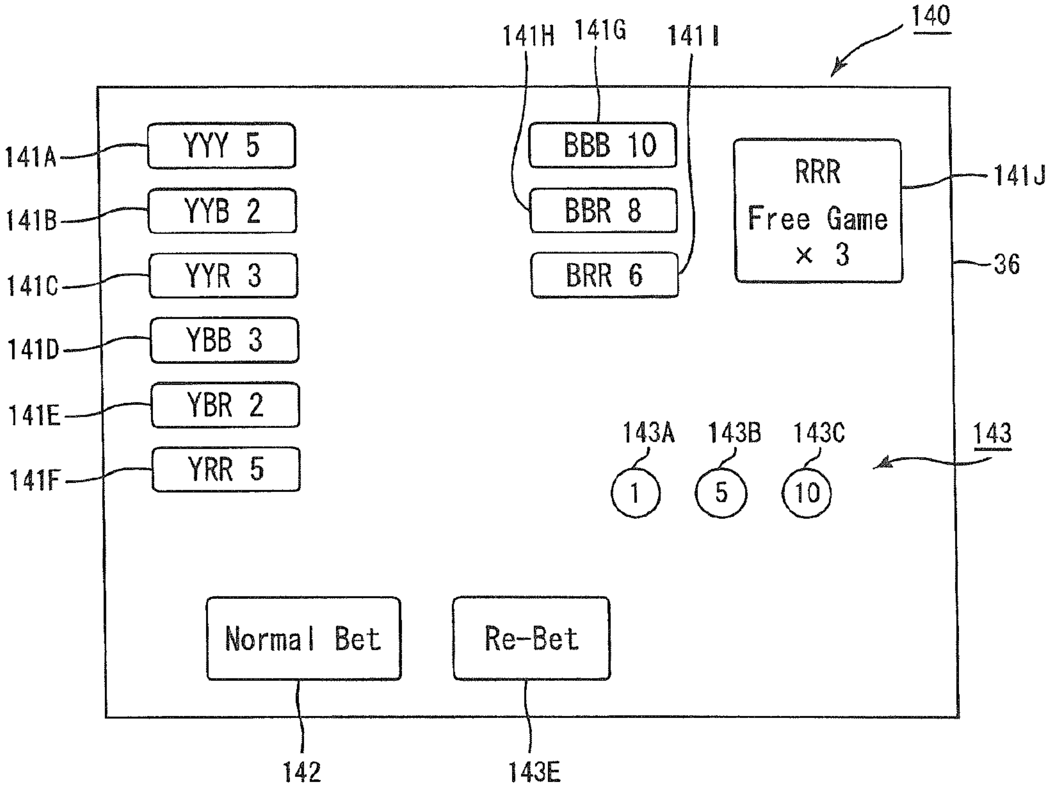
FIG. 8A is an exemplary view showing a display screen displayed to the image display.
Figure 8B:
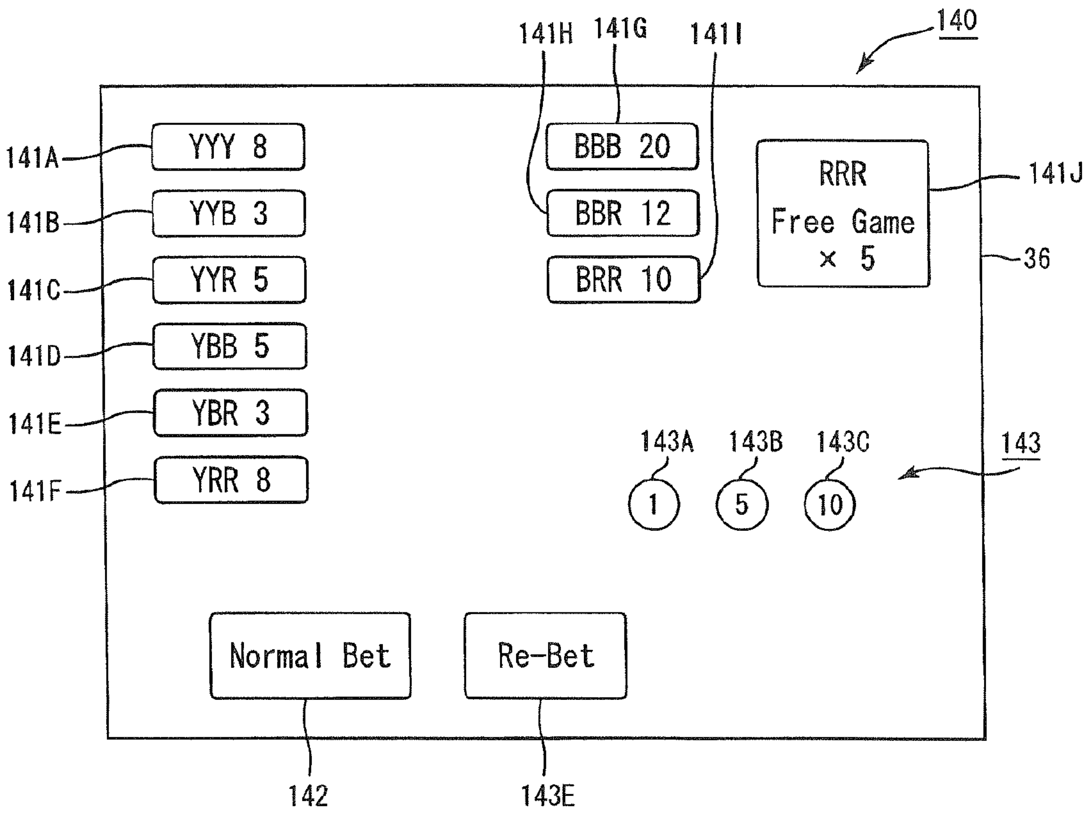
FIG. 8B is another exemplary view showing a display screen displayed to the image display.

Further, the player can switch the screen displayed to the image display 7 from the normal BET screen 40 to a side BET screen 140 by touching a portion on the touch panel 35 which corresponds to the side BET button 42. The side BET screen 140 will be described later using FIG. 8 (FIGS. 8A and 8B).

In the right portion of the side BET button 42, there are displayed unit BET buttons 43, a Re-BET button 43E, a payback result display portion 45, and a number-of-credits display portion 46 in order from the left.

The unit BET buttons 43 are used for betting a chip as the normal BET on the normal BET area 41 specified by the player. The unit BET buttons 43 are configured by four types of buttons: a 1-BET button 43A; a 5-BET button 43B; a 10-BET button 43C; and a 100-BET button 43D. It is to be noted that, when the BET operation is wrongly performed, it can be performed again by touching a Re-BET button 43E with the finger or the like.

The player first touches the touch panel 35 with the finger or the like to specify the normal BET area 41 by using a cursor 47. At this state, touching the 1-BET button 43A with the finger or the like enables the player to BET one chip as the normal BET at a time (the number of BETs increases in order of 1, 2, 3, and so forth every time the 1-BET button 43A is touched with the finger or the like). Similarly, touching the 5-BET button 43B with the finger or the like enables the player to BET five chips as the normal BET at a time (the number of BETs increases in order of 5, 10, 15, and so forth every time the 5-BET button 43B is touched with the finger or the like). Touching the 10-BET button 43C with the finger or the like enables the player to BET ten chips as the normal BET at a time (the number of BETs increases in order of 10, 20, 30, and so forth every time the 10-BET button 43C is touched with the finger or the like). Touching the 100-BET button 43D with the finger or the like enables the player to BET one hundred chips as the normal BET at a time (the number of BETs increases in order of 100, 200, 300, and so forth every time the 100-BET button 43D is touched with the finger or the like). The number of normal BET chips up to the present moment is displayed as a chip mark 48, and a number displayed within the chip mark 48 shows the number of normal BETs of chips.

In a payback result display portion 45, the number of BETs of chips of the player and the number of payback credits in the previous game are displayed. A number obtained by subtracting the number of BETs from the number of payback credits indicates the number of credits newly acquired by the player in the previous game.

In the number-of-credits display portion 46, the number of credits owned by the player is displayed. This number of credits decreases according to the number of BETs (one credit per one chip) when chips are BET. Further, when the BET chips are won and credits are paid back, the number of credits increases by the number of the paid back credits. It is to be noted that, when the number of credits becomes 0, the game is ended.

Next, the normal BET areas 41 on the normal BET screen 40 are described.

The normal BET areas 41A, 41B are portions used when the player places the normal BET based on a prediction of the total value of the dice 70A to 70C. Namely, the normal BET area 41A is selected when the total value is predicted to be 4 to 10, and the normal BET area 41B is selected when the total value is predicted to be 11 to 17. The payout is set to 1:1 (two chips are paid out with respect to one BET).

The normal BET area 41C is a portion used when the player places the normal BET based on a prediction that the outcomes of two dice 70 out of the three dice 70 will be the same. Namely, the normal BET area 41C is used when the player places the normal BET based on a prediction that any of the combinations of the outcomes (1, 1), (2, 2), (3, 3), (4, 4), (5, 5) and (6, 6) will appear, out of the outcomes of the three dice 70; here, the payout is set to 1:10.

The normal BET area 41D is a portion used when the player places the normal BET based on a prediction that all of the outcomes of the three dice 70 will be the same. Namely, the normal BET area 41D is used when the player places the normal BET based on a prediction that the outcomes of the three dice 70 will be any of (1, 1, 1), (2, 2, 2), (3, 3, 3), (4, 4, 4), (5, 5, 5) and (6, 6, 6). The payout is set to 1:30.

The normal BET area 41E is a portion used when the player places the normal BET based on a prediction that all of the outcomes of the three dice 70 will be the same, and a prediction of the value that the three dice 70 will have. Namely, the normal BET area 41E is used when the player places the normal BET based on a prediction that the outcomes of the three dice 70 will be (1, 1, 1), (2, 2, 2), (3, 3, 3), (4, 4, 4), (5, 5, 5) or (6, 6, 6) and also a prediction of the value that the three dice 70 will have. The payout is set to 1:180.

The normal BET area 41F is a portion used when the player places the normal BET based on a prediction of the total value of the three dice 70. The payout is set according to an appearance probability of the total value: the payout is 1:60 when the total value is 4 or 17; 1:30 when the total value is 5 or 16; 1:18 when the total value is 6 or 15; 1:12 when the total value is 7 or 14; 1:8 when the total value is 8 or 13; 1:7 when the total value is 9 or 12; and 1:6 when the total value is 10 or 11.

The normal BET area 41G is a portion used when the player places the normal BET based on a prediction of the outcomes of two dice 70 out of the three dice 70. The payout is set to 1:5.

The normal BET area 41H is a portion used when the player places the normal BET based on a prediction of the outcome of at least one die 70 out of the dice 70; the payout is set according to the number of the dice 70 with the outcome corresponding to the predicted outcome.

FIGS. 8A and 8B are views each showing one example of the display screen displayed to the image display.

FIGS. 8A and 8B are views each showing one example of the side BET screen.

On the side BET screen 140, a plurality of side BET areas 141 (side BET area 141A, side BET area 141B, side BET area 141C, side BET area 141D, side BET area 141E, side BET area 141F, side BET area 141G, side BET area 141H, side BET area 141I, and side BET area 141J), and a normal BET button 142 are displayed. A side BET operation is performed by touching the touch panel 35 with a finger or the like to specify any of the side BET areas 141, and making chips displayed on the specified side BET area 141. Further, the player can switch the screen displayed to the image display 7 from the side BET screen 140 to the normal BET screen 40 by touching a place on the touch panel 35 which corresponds to the normal BET button 142.

On the side BET areas 141A to 141J, character sequences consisting of “Y”, “B” and “R” are displayed. “Y” corresponds to yellow, "B" corresponds to blue, and "R" corresponds to red. The character sequences consisting of "Y", "B" and "R" indicate color combinations. While predicting the combination of the colors determined by the stopped dice, the player can make an input indicating placement of the side BET by touching a portion on the touch panel 35 which corresponds to any of the side BET areas 141A to 141J. Since a specific method for inputting the side BET is substantially the same as the method for inputting the normal BET, a description thereof is omitted here.

Further, a number is displayed on each of the side BET areas 141A to 141I. These numbers indicate the numbers of game media to be paid out when the side BET is placed with a single game medium (hereinafter referred to as odds) (cf. FIG. 2). As described using FIG. 2, in the present embodiment, the larger the number of game media are BET as the normal BET, the larger number of game media are paid out as the side-game payout. Different numbers are displayed in FIGS. 8A and 8B due to the difference in numbers of game media having been BET as the normal BET.

FIG. 8A shows a side BET screen that is displayed when the number of game media having been BET as the normal BET is not smaller than five and not larger than nine. FIG. 8B shows a side BET screen that is displayed when the number of game media have been BET as the normal BET is not smaller than ten and not larger than 29. As thus described, in the present embodiment, the side BET screen is displayed indicating odds that vary depending upon the number of game media having been BET as the normal BET.

It is to be noted that, as shown in FIG. 2, in the present embodiment, the side-game payout is not offered when the number of game media having been BET as the normal BET is smaller than five. Accordingly, the gaming machine 1 is configured such that in a case where the number of game media having been BET as the normal BET is smaller than five, even when the portion on the touch panel 35 which corresponds to the side BET button 42 shown in FIG. 7 is touched, the screen is not switched to the side BET screen 140.

Further, in the side BET area 141J, characters "Free Game×C" are displayed. Here, a symbol "C" denotes the number of free games (cf. FIG. 2) set in accordance with the number of game media having been BET as the normal BET. It is to be noted that in the present embodiment, the side BET on the combination (RED, RED, RED) needs to be placed with a predetermined number (ten) of game media for placing the side BET.

Figure 9:
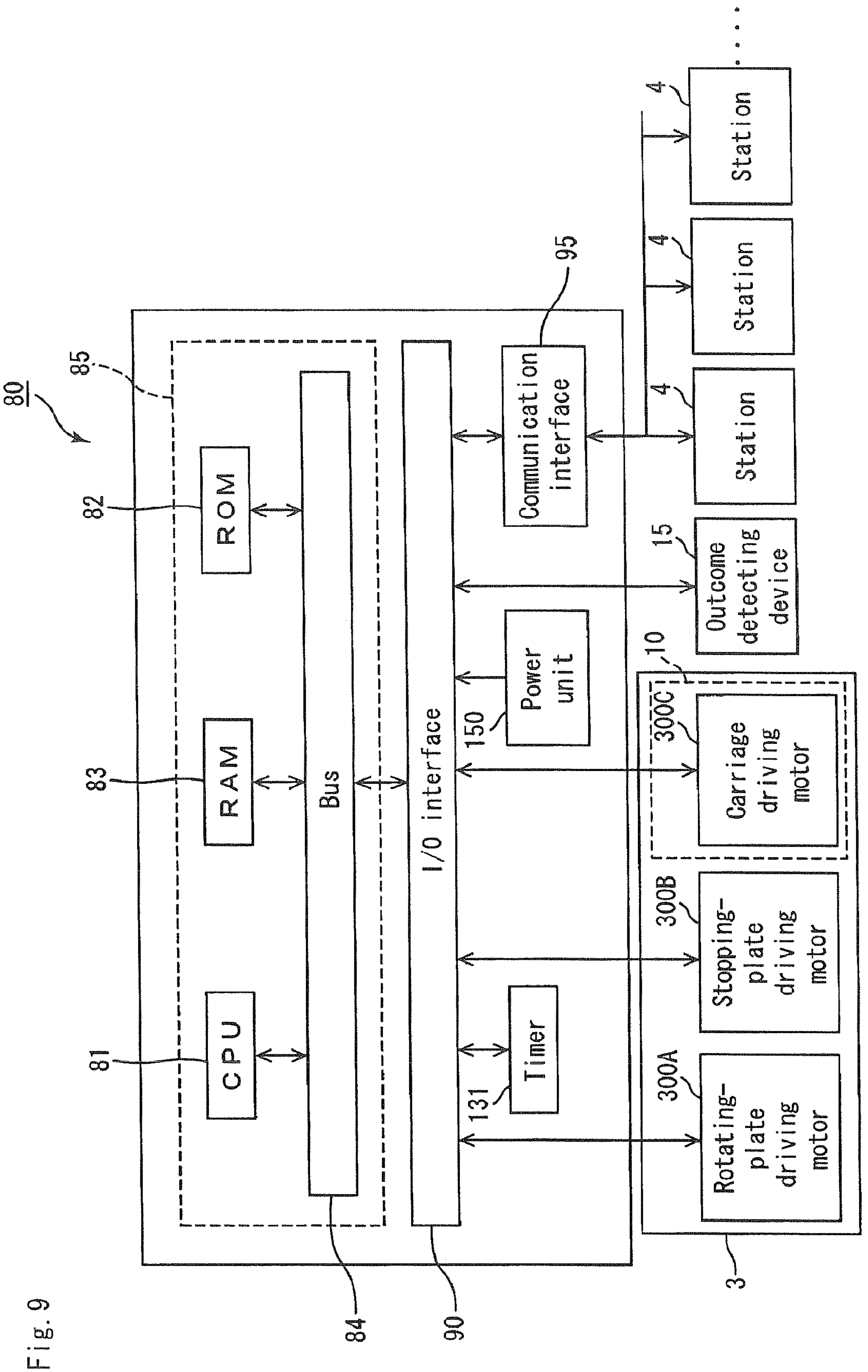
FIG. 9 is a block diagram showing an internal configuration of the gaming machine shown in FIG. 3.

FIG. 9 is a block diagram showing an internal configuration of a main control portion 80 in the gaming machine shown in FIG. 3.

The main control portion 80 of the gaming machine 1 has a microcomputer 85, which mainly comprises a CPU 81, a ROM 82, a RAM 83, and a bus 84 that transfers data mutually thereamong.

The CPU 81 is connected to the rotating-plate driving motor 300A, the stopping-plate driving motor 300B and the carriage driving motor 300C, through an I/O interface 90. Further, through the I/O interface 90, the CPU 81 is connected to a timer 131 capable of measuring time. The I/O interface 90 is also connected with the foregoing outcome detecting device 15, and transmits and receives information on the outcomes of the three dice 70 having stopped on the stopping plate 100, information on the colors of the stopping plate 100 where the dice have stopped and the like, to and from the outcome detecting device 15.

Moreover, the I/O interface 90 is connected with a communication interface 95; through this communication interface 95, the main control portion 80 transmits and receives data such as BET information, and payout information, to and from each station 4.

Further, the I/O interface 90 is connected with a power unit 150. When the power is supplied from the power unit 150, the CPU 81 of the main control portion 80 is activated, and simultaneously, the power is supplied to each station 4 through the communication interface 95 so that the CPU 111 of each station 4 is activated.

The ROM 82 of the main control portion 80 stores programs (dice game programs) for realizing a basic function of the gaming machine 1, specifically a program for controlling a variety of devices for driving the gaming portion 3, a program for controlling each station 4, and the like, and also stores a main-game payout table, data showing predetermined time T, data showing a specific value TT, and the like. Further, the ROM 82 stores a side-game payout table showing the corresponding relationships among the color combinations, the numbers of game media having been BET as the normal BET, and the side-game payout amounts.

Further, the ROM 82 stores a program such as BIOS (Basic Input/Output System) that is executed by the CPU 81, and an authentication program. When the BIOS is executed by the CPU 81, not only is initialization processing for predetermined peripheral devices conducted, but processing of fetching a dice game program is also started. The authentication program is a program for authenticating the dice game programs, and is described along procedures (authentication procedures) for authenticating the dice game programs.

The RAM 83 is a memory for temporarily storing a variety of data calculated in the CPU 81, and for example, it temporarily stores BET information which is transmitted from each station 4 (normal BET information on the normal BET input and the side BET information on side BET input), the outcome information showing the outcomes of the dice 70 which is transmitted from the outcome detecting device 15, the color information showing the colors of the stopping plate 100 where the dice have stopped, data on results of processing executed by the CPU 81, and the like.

Based on the data and programs stored in the ROM 82 and the RAM 83, the CPU 81 controls the rotating-plate driving motor 300A, the stopping-plate driving motor 300B and the carriage driving motor 300C which drive the gaming portion 3, throws the dice 70 onto the rotating plate 3*b* of the gaming portion 3, and performs some other operations. Further, the CPU 81 executes control processing associated with the proceeding of the game, such as processing of checking the outcome of each of the dice 70 having stopped on the stopping plate 100.

In addition to the control processing associated with the proceeding of the game, the CPU 81 has the function of controlling each station 4 so as to make the game proceed, by transmitting and receiving data to and from each station 4. Specifically, the CPU 81 receives BET information transmitted from each station 4. Further, based on the outcomes of the dice 70 and the BET information transmitted from each station 4, the CPU 81 performs winning determination processing, to calculate an amount of payout to be paid out at each station 4 with reference to the payout table stored in the ROM 82.

Figure 10:
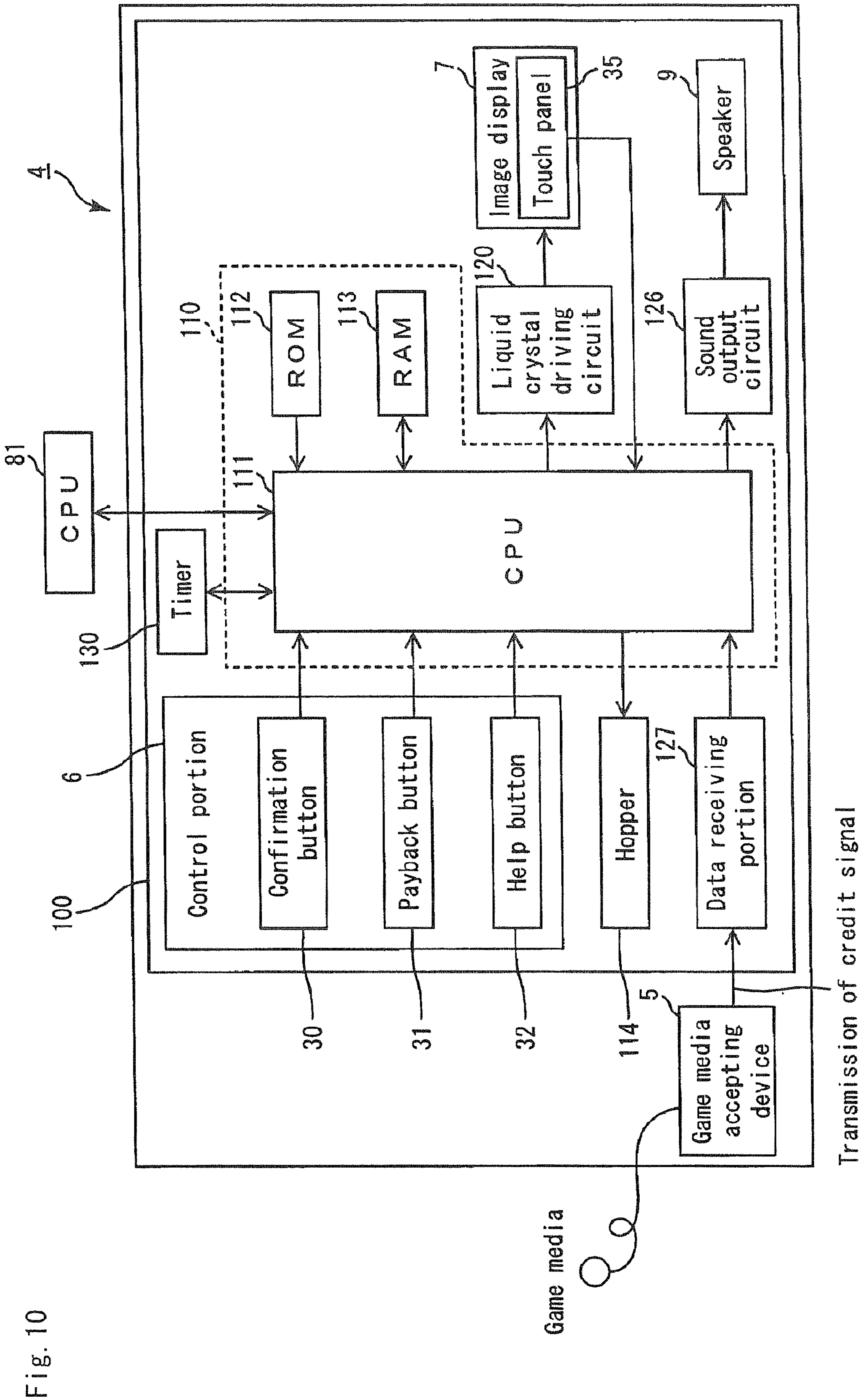
FIG. 10 is a block diagram showing an internal configuration of one of the stations shown in FIG. 3.

FIG. 10 is a block diagram showing an internal configuration of the station shown in FIG. 3.

The station 4 includes a main body portion 100 provided with the image display 7 and the like, and the game media accepting device 5 installed on the main body portion 100. Further, the main body portion 100 includes a station-controlling portion 110 and several peripheral devices.

The station-controlling portion 110 includes a CPU 111, a ROM 112, and a RAM 113.

The ROM 112 stores a program for realizing a basic function of the station 4, a variety of programs necessary for controlling the station 4, a data table, and the like. Further, the ROM 112 stores the side-game payout table showing the corresponding relationships among the color combinations, the numbers of game media having been BET as the normal BET, and the side-game payout amounts.

Moreover, the ROM 112 stores a program such as BIOS (Basic Input/Output System) that is executed by the CPU 111. When the BIOS is executed by the CPU 111, initial processing for prescribed peripheral devices is performed.

The RAM 113 is a memory that temporarily stores a variety of data calculated in the CPU 111, the number of credits owned by the player, the state of the BET placed by the player, a variety of flags, and the like. The RAM 113 is provided with a number-of-free-games storage area. In the number-of-free-games storage area, data showing the remaining number of free games is stored.

The CPU 111 is connected separately with the confirmation button 30, the payback button 31, and the help button 32 which are provided in the control portion 6. Further, based on an operation signal output at the press of each button or the like, the CPU 111 performs control so as to execute a variety of operations corresponding to the signal. Specifically, the CPU 111 executes a variety of processing, based on an input signal that is supplied from the control portion 6 when the player has input an operation and on the data and programs stored in the ROM 112 and the RAM 113, and transmits the results of the processing to the CPU 81 of the main control portion 80.

Further, the CPU 111 receives a command signal from the CPU 81 of the main control portion 80, to control the peripheral devices constituting the station 4. Moreover, the CPU 111 executes a variety of processing, based on input signals supplied from the control portion 6 and the touch panel 35 and on the data and programs stored in the ROM 112 and the RAM 113. Based on the results of the processing, the CPU 111 controls the peripheral devices constituting the station 4. It is to be noted that which method is to be applied in performing the processing is set for each processing according to the content of the processing. For example, the processing of paying out game media corresponds to the former, and the BET operation processing by the player corresponds to the latter.

The CPU 111 is connected with a hopper 114, and the hopper 114 pays out a predetermined number of game media from the payout exit 8 based on a command signal from the CPU 111.

The CPU 111 is connected with the image display 7 through a liquid crystal driving circuit 120. The liquid crystal driving circuit 120 includes a program ROM, an image ROM, an image control CPU, a work RAM, a VDP (video display processor), a video RAM, and the like. The program ROM stores an image control program regarding display to the image display 7 and a variety of selection tables. The image ROM stores, for example, dot data for forming an image displayed to the image display 7. Further, based on parameters set in the CPU 111, the image control CPU determines an image to be displayed to the image display 7 out of the dot data previously stored inside the image ROM, according to the image control program previously stored inside the program ROM. Moreover, the work RAM is configured as a temporary storage device in execution of the image control program in the image control CPU. Further, the VDP forms an image according to the display contents determined by the image control CPU, and outputs the image to the image display 7. It is to be noted that the video RAM is configured as a temporary storage device in formation of an image by the VDP.

The touch panel 35 is installed on the front surface of the image display 7, as described above, and information on the operation of the touch panel 35 is transmitted to the CPU 111. The touch panel 35 detects an input operation performed by the player on the normal BET screen 40, the side BET screen 140 and the like.

Specifically, selection of the normal BET areas 41 of the normal BET screen 40 and the side BET button 42 of the side BET screen 60, input using the unit BET buttons 43 and the like are performed by the operation of touching the touch panel 35, and the information of the operation is transmitted to the CPU 111. Based on the information, normal BET information of the player is stored in the RAM 113. Further, the normal BET information is transmitted to the CPU 81 of the main control portion 80, and stored in the BET information storage area in the RAM 83. Further, an input and the like from the side BET area 141 of the side BET screen 140 is made by performing an operation of touching the touch panel 35, and information thereof is transmitted to the CPU 111. Based upon that information, the side BET information of the player is stored into the RAM 113. Further, the side BET information is transmitted to the CPU 81 of the main control portion 80, and stored into a side BET information storage area of the RAM 83.

Further, the sound output circuit 126 and the speakers 9 are connected to the CPU 111, and the speakers 9 generate a variety of effect sounds when a variety of effects are produced based on output signals from the sound output circuit 126. Moreover, the CPU 111 is connected with the game media accepting device 5 functioning as a device into which game media such as medals or currency are inserted. A data receiving portion 127 receives a credit signal transmitted from the game media accepting device 5, and the CPU 111 increases the number of credits of the player stored in the RAM 113 based on the transmitted credit signal.

The CPU 111 is connected with a timer 130 capable of measuring time.

Subsequently, processing executed in the gaming machine according to the first embodiment is described with reference to FIGS. 11 to 16.

Figure 11:
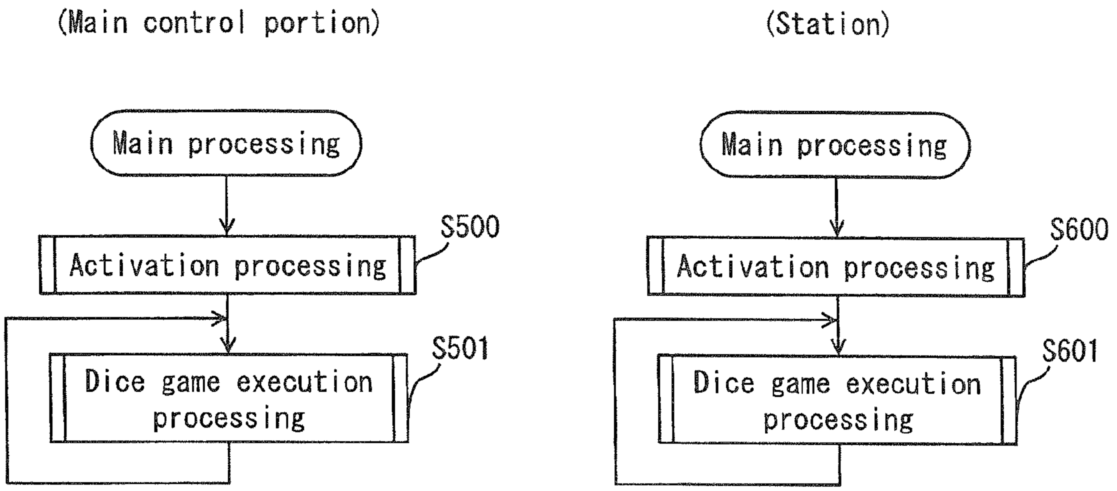
FIG. 11 is a flowchart showing main processing performed in a main control portion and main processing performed in the station.

FIG. 11 is a flowchart showing main processing performed in the main control portion and main processing performed in the station.

In the main control portion 80, the following main processing is performed.

The CPU 81 of the main control portion 80 executes activation processing (step S500). The activation processing performed in step S500 will be described later using FIG. 16. After executing the activation processing, the CPU 81 executes dice game execution processing (step S501). The dice game execution processing performed in step S501 will be described later using FIG. 12. Meanwhile, the following main processing is performed in the station 4.

The CPU 111 of the station 4 executes activation processing (step S600). The activation processing performed in step S600 will be described later using FIG. 16. After executing the activation processing, the CPU 111 executes dice game execution processing (step S601). The dice game execution processing performed in step S601 will be described later using FIGS. 13 to 15.

Figure 12:
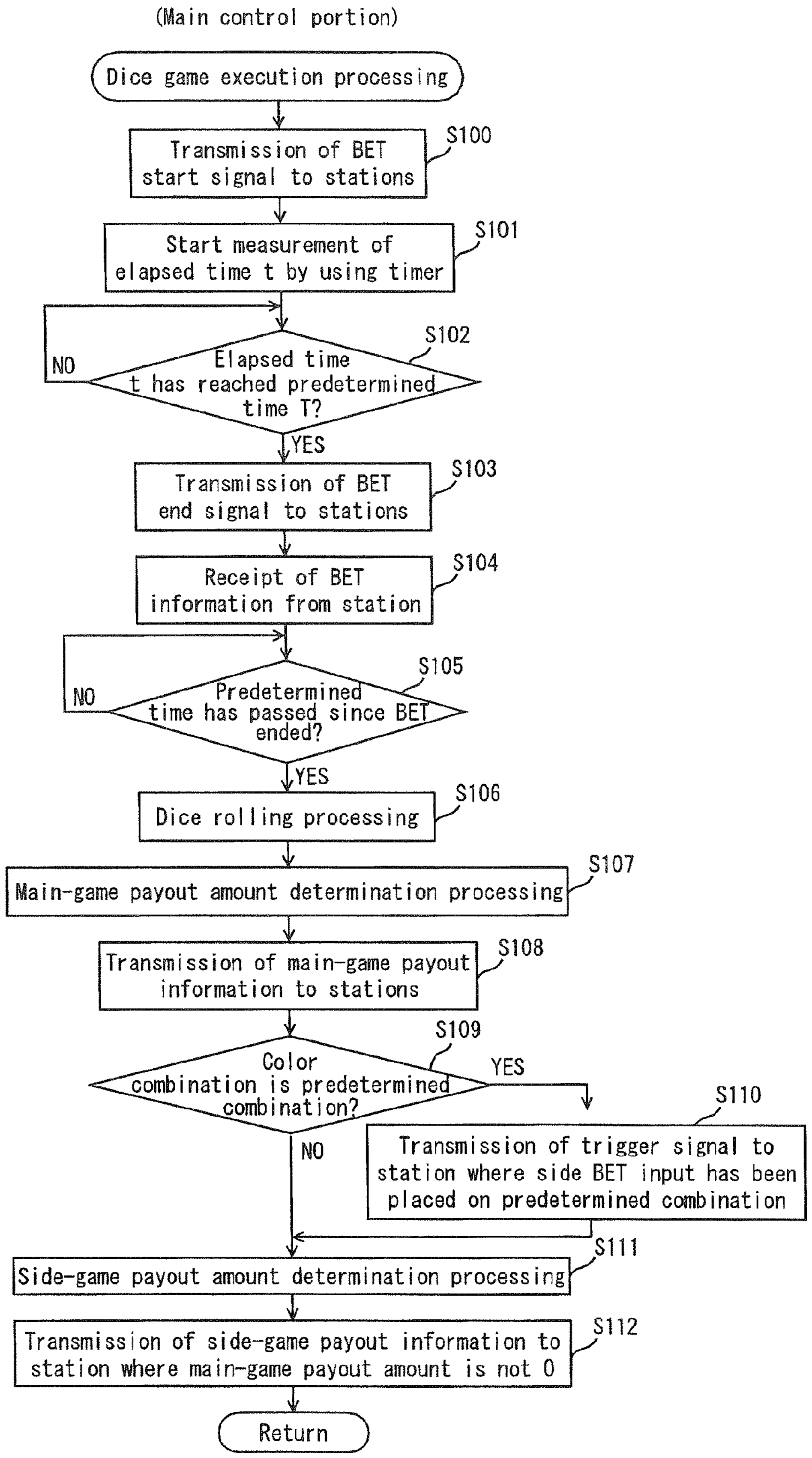
FIG. 12 is a flowchart showing a subroutine of dice game execution processing that is performed in the main control portion according to a first embodiment.

FIG. 12 is a flowchart showing a subroutine of dice game execution processing that is performed in the main control portion according to the first embodiment.

First, in step S100, the CPU 81 transmits a BET start signal to each station 4.

In step S101, the CPU 81 starts measurement of elapsed time t by using the timer 131. Next, the CPU 81 compares the elapsed time t measured by the timer 131 with data indicating predetermined time T stored in the ROM 82, and then determines whether or not the elapsed time t measured by the timer 131 has reached the predetermined time T (step S102).

When determining in step S102 that the elapsed time t has not reached the predetermined time T, the CPU 81 returns the processing to step S102. On the other hand, when determining in step S102 that the elapsed time t has reached the predetermined time T, the CPU 81 transmits a BET end signal to each station 4 (step S103).

The CPU 81 then receives BET information from each station 4 (step S104). The BET information is information on the normal BET input and the side BET input which have been made in each station 4.

After completion of BETTING in each station 4, the CPU 81 determines whether or not predetermined time (TT) has elapsed (step S105). In this processing, the CPU 81 determines whether or not the difference between the elapsed time t measured by the timer 131 and the predetermined time T stored in the ROM 82 has become a specific value TT stored in the ROM 82. More specifically, the CPU 81 first subtracts the predetermined time T stored in the ROM 82 from the elapsed time t measured by the timer 131. The CPU 81 further compares the numeric value obtained by the subtraction with the specific value TT stored in the ROM 82, and determines whether or not the numeric value obtained by the subtraction has become the specific value TT stored in the ROM 82. By appropriately setting data showing the specific value TT, setting can be made such that processing of rolling the dice 70 can be performed at a desired timing.

When determining in step S105 that the predetermined time (TT) has not elapsed after completion of BETTING in each station 4, the CPU 81 returns the processing to step S105. On the other hand, when determining in step S105 that the predetermined time (TT) has elapsed after completion of BETTING in each station 4, the CPU shifts the processing to step S106.

The CPU 81 executes processing of rolling the dice 70 in step S106. In the processing, based on the data and programs stored in the ROM 82 and the RAM 83, the CPU 81 controls the rotating-plate driving motor 300A, the stopping-plate driving motor 300B and the carriage driving motor 300C so as to perform control of throwing in the dice 70, control of rolling the dice 70, control of stopping the dice 70, and the like. Further, the CPU 81 executes control processing associated with the proceeding of the game, such as processing of checking the outcome of each of the dice 70 having stopped on the stopping plate 100, and the color of the stopping plate 100 on which each of the dice 70 has stopped and the like.

In step S107, the CPU 81 executes main-game payout amount determination processing. In the processing, the CPU 81 executes winning determination processing, based on the information on the outcomes of the dice 70 having stopped on the stopping plate 100 and the normal BET information received from each station 4. The CPU 81 then calculates an amount of game media (main-game payout amount) to be paid out at each station 4 with reference to the main-game payout table stored in the ROM 82.

Next, the CPU 81 transmits to each station 4 main-game payout information indicating a main-game payout amount in each station 4 (step S108).

Next, the CPU 81 determines whether or not the color combination is the predetermined combination (RED, RED, RED) based upon the color information indicating the colors of the stopping plate 100 to which the stopped dice 70 belong (step S109).

When determining that the color combination is the predetermined combination (RED, RED, RED), the CPU 81 transmits a trigger signal to the station 4 where the side BET input has been placed on the predetermined combination (RED, RED, RED), based upon the side BET information received from each station 4 (step S110). The trigger signal is a signal for starting execution of processing relating to the free game in each station 4 based upon that the color combination has become the predetermined combination (RED, RED, RED). The trigger signal includes information on the number of free games indicating the number-of-free-games C. The number-of-free-games C is set based upon the number of game media having been BET as the normal BET in the station 4 where the side BET input has been made on the combination (RED, RED, RED) (cf. FIG. 2).

When determining in step S109 that the color combination is not the predetermined combination (RED, RED, RED), or after executing the processing of step S110, the CPU 81 performs side-game payout amount determination processing (step S111). In this processing, the CPU 81 performs winning determination processing based upon color information indicating the colors of the stopping plate 100 to which the stopped dice 70 belong and the side BET information received from each station 4, and calculates an amount of the game media to be paid out (side-game payout amount) in each station 4 with reference to the side-game payout table stored in the ROM 82.

Next, the CPU 81 transmits the side-game payout information indicating the side-game payout amount determined in step S111 to the station 4 where the main-game payout amount determined in step S107 is not 0 (step S112).

In the first embodiment, the side-game payout amounts in all stations 4 are determined in step S111. However, in the present invention, only the side-game payout amount in the station where the main-game payout amount is not 0 may be determined.

After executing the processing of step S112, the CPU 81 completes the present subroutine.

In the above, the processing performed in the main control portion 80 has been described.

Subsequently, the processing performed in the station 4 will be described.

Figure 13:
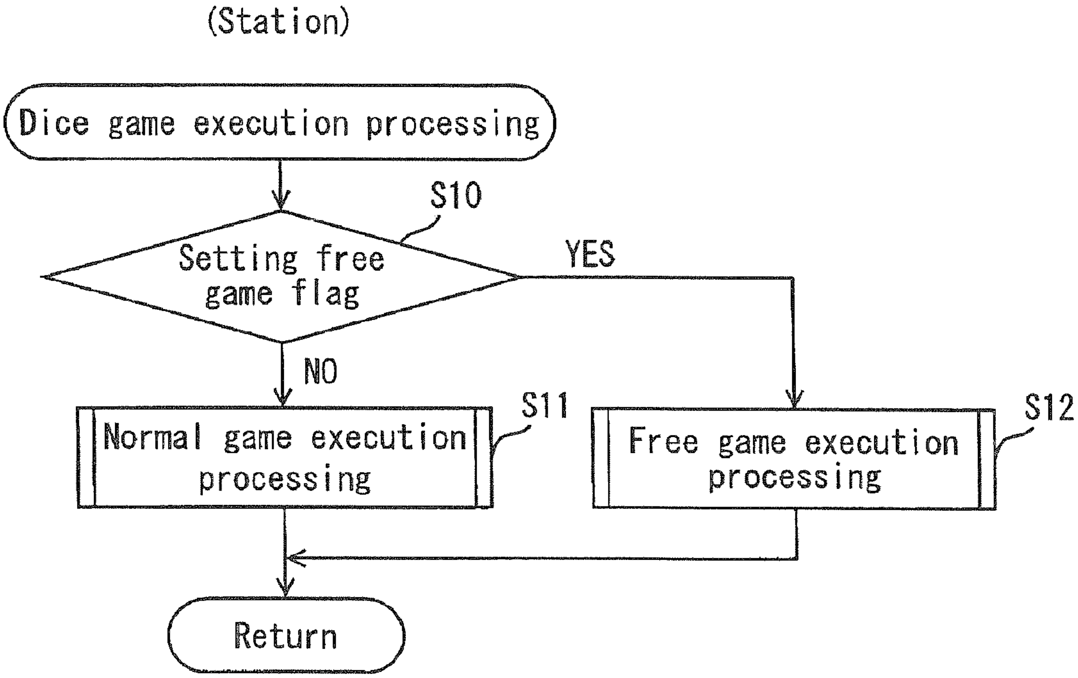
FIG. 13 is a flowchart showing a subroutine of dice game execution processing that is performed in the station.

FIG. 13 is a flowchart showing a subroutine of dice game execution processing performed in the station.

First, the CPU 111 determines whether or not a free game flag has been set (step S10). The free game flag is a flag that is set in the station 4 where the side BET has been placed on the predetermined combination (RED, RED, RED) in the normal game which has resulted in the predetermined color combination (RED, RED, RED), as well as a flag indicating that the free game is in operation (cf. step S27 in FIG. 14).

When determining that the free game flag has not been set, the CPU 111 executes the normal game execution processing (step S11). On the other hand, when determining that the free game flag has been set, the CPU 111 executes the free game execution processing (step S12). After executing the processing in step S11 or step S12, the CPU 111 completes the present subroutine.

Figure 14:
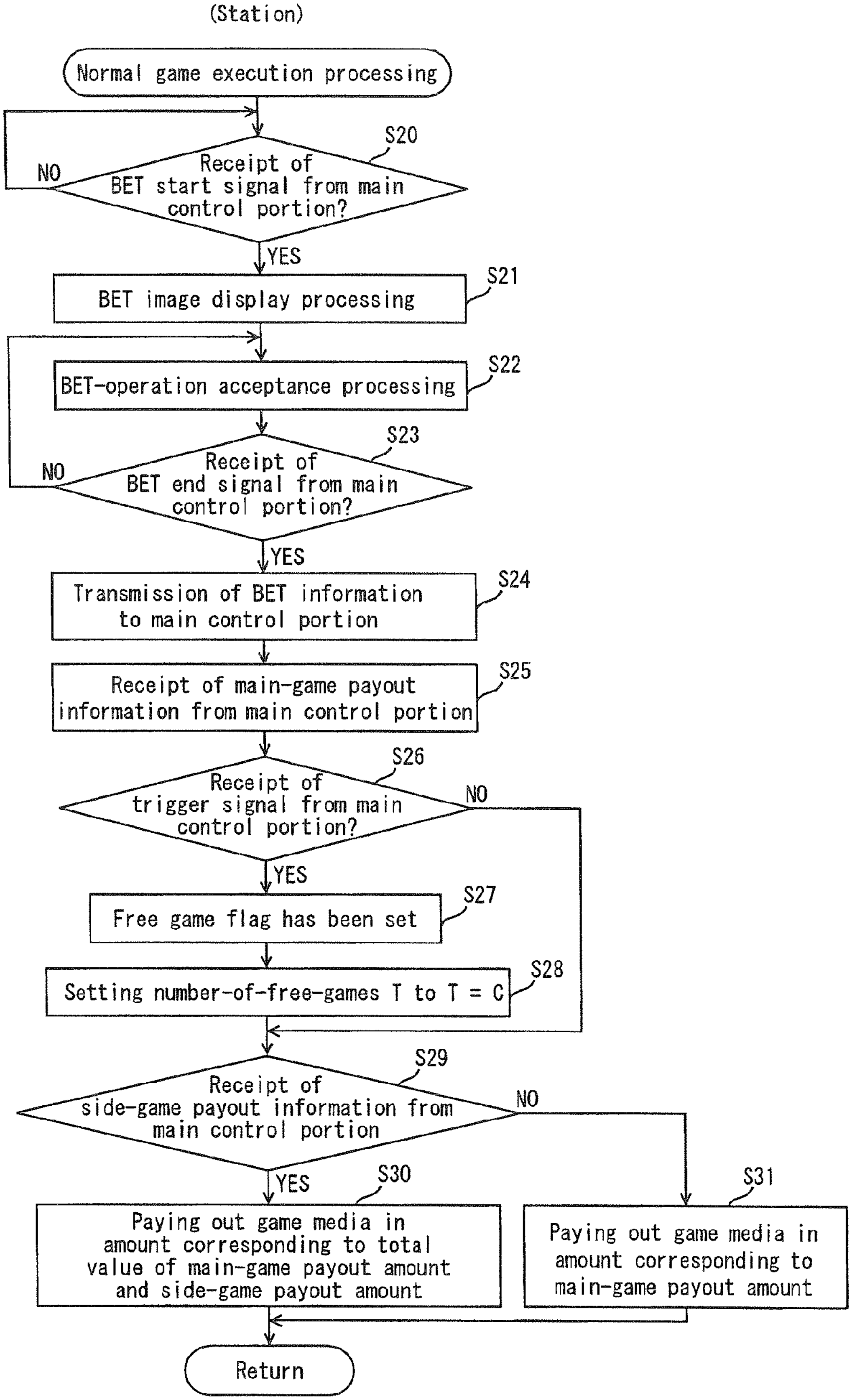
FIG. 14 is a flowchart showing a subroutine of normal game execution processing that is performed in the station.

FIG. 14 is a flowchart showing a subroutine of normal game execution processing that is performed in the station.

First, in step S20, the CPU 111 determines whether or not a BET start signal has been received from the main control portion 80. When determining that the BET start signal has not been received, the CPU 111 returns the processing to step S20. On the other hand, when determining that the BET start signal has been received, the CPU 111 shifts the processing to step S21.

The CPU 111 executes BET-image display processing in step S21. In the processing, the CPU 111 displays the BET screen 40 shown in FIG. 7 to the image display 7.

The CPU 111 executes BET-operation acceptance processing in step S22. In the processing, the CPU 111 accepts a normal BET input and a side BET input by the player through the touch panel 35. Further, in this processing, the CPU 111 displays the side BET screen to the image display 7 when receiving a signal transmitted when a portion on the touch panel 35 which corresponds to the side BET button is touched. At this time, with reference to the side-game payout table stored in the ROM 112, the CPU 111 identifies odds set for each color combination based upon the number of game media having been BET as the normal BET, and displays to the image display 7 the side BET screen with the identified odds displayed thereon (cf. FIG. 8).

Next, the CPU 111 determines whether or not a BET end signal has been received from the main control portion 80 (step S23). When determining that the BET end signal has not been received, the CPU 111 returns the processing to step S22. On the other hand, when determining that the BET end signal has been received, the CPU 111 shifts the processing to step S24.

The CPU 111 transmits the BET information to the main control portion 80 in step S24. In the processing, the CPU 111 transmits to the main control portion 80 information regarding the normal BET input and the side BET input, the information having been accepted in step S22, as BET information. It is to be noted that the BET information includes the identification number of the station 4.

Next, the CPU 111 receives the main-game payout information from the main control portion 80 (step S25).

Subsequently, the CPU 111 determines whether or not the trigger signal has been received from the main control portion 80 (step S26).

When determining that the trigger signal has been received, the CPU 111 sets the free game flag (step S27). As described above, The free game flag is a flag that is set in the station 4 where the side BET has been placed on the predetermined combination (RED, RED, RED) in the normal game which has resulted in the predetermined color combination (RED, RED, RED), as well as a flag indicating that the free game is in operation.

Next, the CPU 111 sets the number-of-remaining-free-games T to T=C in a predetermined area (number-of-free-games storage area) of the RAM 113 (step S36). Here, a symbol "C" denotes a number indicated by number-of-free-games information which is included in the trigger signal received in step S26.

When determining in step S26 that the trigger signal has not been received, or after executing the processing of step S28, the CPU 111 determines whether or not to have received the side-game payout information from the main control portion 80 (step S29).

When determining that the side-game payout information has been received, the CPU 111 performs processing in accordance with payout of game media corresponding to a total of the main-game payout amount shown by the main-game payout information received in step S25 and the side-game payout amount shown by the side-game payout information received in step S29 (step S30).

On the other hand, when determining that the side-game payout information has not been received, the CPU 111 performs processing relating to paying out of game media corresponding to the main-game payout amount indicated by the main-game payout information received in step S25 (step S31).

In the processing of step S30 or step S31, the CPU 111 updates the number of credits of the player stored in the RAM 113, and also updates display on the refund result display portion 45 and the number-of-credits display portion 46.

After executing the processing of step S30 or step S31, the main CPU 111 completes the present subroutine.

Figure 15:
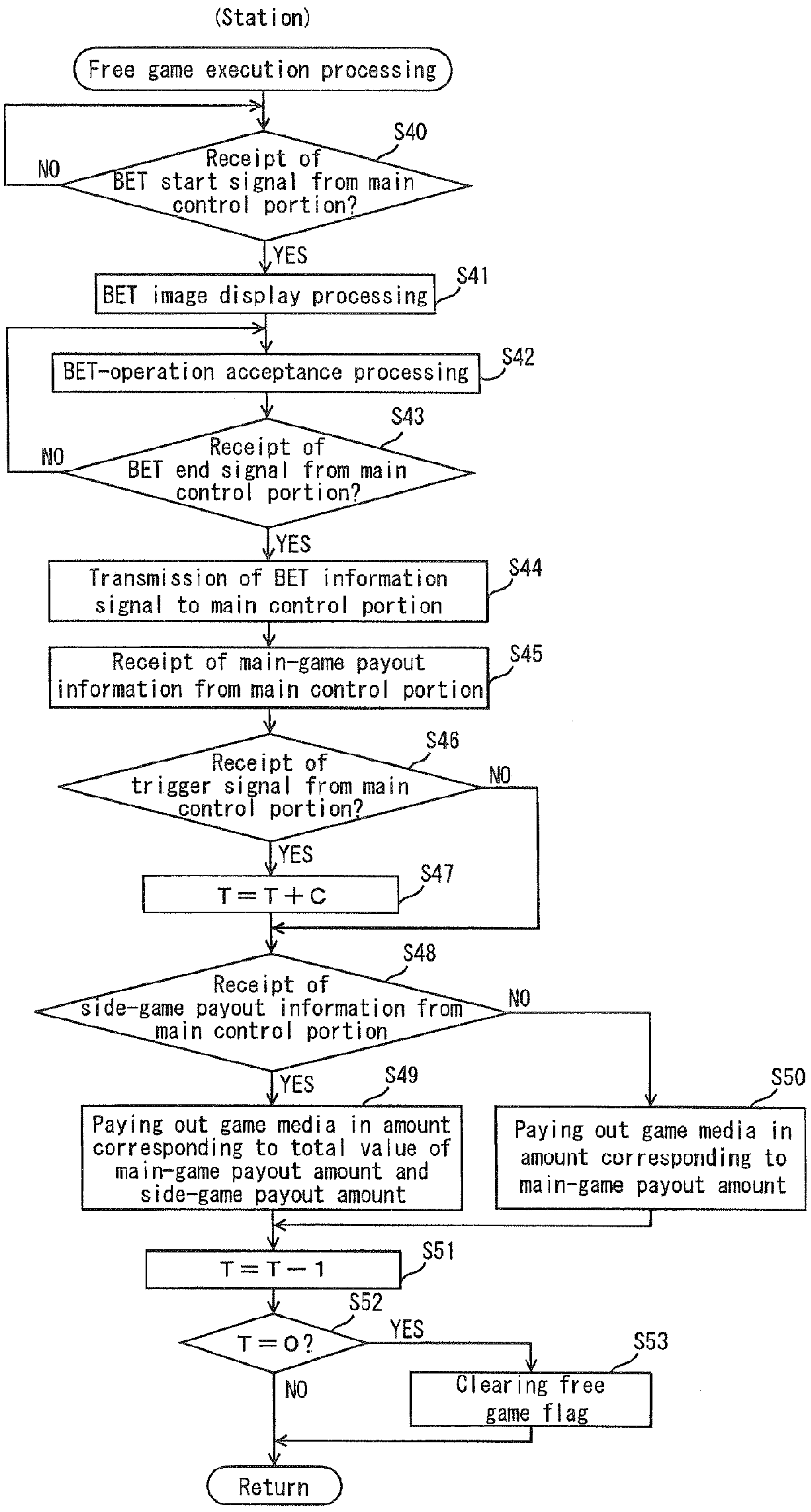
FIG. 15 is a flowchart showing a subroutine of free game execution processing that is performed in the station.

FIG. 15 is a flowchart showing a subroutine of free game execution processing that is performed in the station.

First, the main CPU 111 executes processing of step S40 to step S46. The processing is the same as the processing of step S20 to step S26 in FIG. 14 and a description thereof will be omitted here.

It should be noted that, in step S42, the player can place the normal BET with game media in the same number as the number of game media placed as the normal BET in the normal game having triggered generation of the free game (the normal game which has resulted in the color combination (RED, RED, RED)), without a decrease in number of credits. On the other hand, as for the side BET, the number of credits decreases by the number of game media placed as the side BET.

When determining in step S46 that the trigger signal has been received, the CPU 111 sets the number-of-remaining-free-games T to T=T+C in the number-of-free-games storage area of the RAM 113 (step S47). Namely, in the present embodiment, in a case where the side BET is placed on the combination (RED, RED, RED) during the free games, when the combination of the colors determined by the stopped dice has resulted in the combination (RED, RED, RED), the number-of-remaining-free-games increases by a number C. Here, a symbol "C" denotes a number determined based upon the number of game media having been BET as the normal BET in the normal game in which generation of the free game has been triggered (the normal game which has resulted in the color combination (RED, RED, RED)) (cf. FIG. 2).

When determining in step S46 that the trigger signal has not been received, or after executing the processing of step S47, the CPU 111 determines whether or not to have received the side-game payout information from the main control portion 80 (step S48).

When determining that the side-game payout information has been received, the CPU 111 performs processing relating to paying out of game media corresponding to a total of the main-game payout amount indicated by the main-game payout information received in step S45 and the side-game payout amount indicated by the side-game payout information received in step S48 (step S49).

On the other hand, when determining that the side-game payout information has not been received, the CPU 111 performs processing relating to paying out of game media corresponding to the main-game payout amount indicated by the main-game payout information received in step S45 (step S50).

In the processing of step S49 or step S50, the CPU 111 updates the number of credits of the player which is stored in the RAM 113, and also updates display of the refund result display portion 45 and the number-of-credits display portion 46.

After executing the processing of step S49 or step S50, the CPU 111 sets the number-of-remaining-free-games T to T=T−1 in the number-of-free-game storage area of the RAM 113 (step S51).

Subsequently, the CPU 111 determines whether or not T=0 (step S52).

When determining T is not 0, the CPU 111 completes the present subroutine.

On the other hand, when determining that T is 0, the CPU 111 clears the free game flag (step S53), and completes the subroutine.

Figure 16:
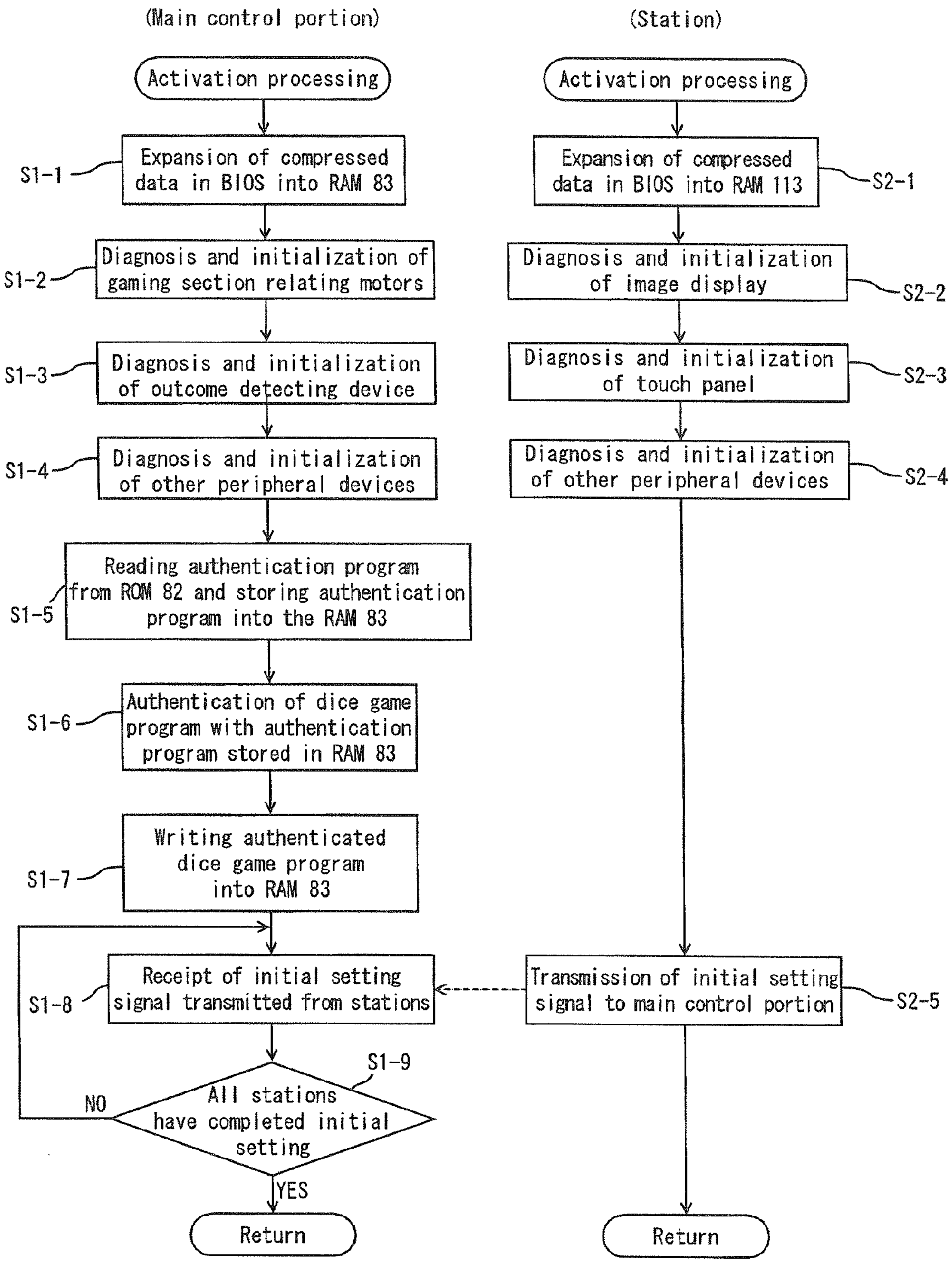
FIG. 16 is a flowchart showing procedures of activation processing.

FIG. 16 is a flowchart showing procedures of activation processing.

This activation processing is processing performed in the main control portion 80 and the station 4 as triggered by switch-on (power-on) in the power unit 150 (cf. step S500 and step S600 in FIG. 11).

When the switch is turned on (the power is turned on) in the power unit 150, first, the CPU 81 of the main control portion 80 executes the BIOS stored in the ROM 82 and expands compressed data, which is incorporated in the BIOS, into the RAM 83 (step S1-1). The CPU 81 then executes the BIOS expanded into the RAM 83, to diagnose and initialize a variety of peripheral devices.

Specifically, the CPU 81 diagnoses and initializes the gaming section relating motors (rotating plate driving motor 300A, stopping plate driving motor 300B, carriage driving motor 300C) (step S1-2). In this processing, the CPU 81 sequentially transmits request signals to a rotating plate driving circuit that controls the rotating plate driving motor 300A, a stopping plate driving circuit that controls the stopping plate driving motor 300B, and a carriage driving circuit that controls the carriage driving motor 300C, and determines whether or not to have received predetermined response signals, and also performs clearance of a predetermined storage area, and the like.

Next, the CPU 81 diagnoses and initializes the outcome detecting device 15 (step S1-3). In this processing, the CPU 81 transmits a request signal to an outcome detection circuit that controls the outcome detecting device 15, and determines whether or not to have received a predetermined response signal, and also performs clearance of a predetermined storage area, and the like.

Next, the CPU 81 diagnoses and initializes the other peripheral devices connected to the CPU 81 (step S1-4).

Next, the CPU 81 reads the authentication program stored in the ROM 82 and also stores the read authentication program into the RAM 83 (step S1-5). At this time, the CPU 81 obtains a checksum by ADDSUM system (standard checking function) in accordance with the function of the standard BIOS of the BIOS, and stores the authentication program into the RAM 83 while performing processing of checking whether or not the storage is performed without an error.

Next, the CPU 81 reads the dice game program from the ROM 82. In this case, the CPU 81 reads data constituting the dice game program by four bytes at a time. Subsequently, the CPU 81 performs authentication for checking and verifying that the read dice game program is authentic (not broken) in accordance with the authentication program stored in the RAM 83 (step S1-6). When normally completing this authentication processing, the CPU 81 writes and stores the dice game program having been the subject to be authenticated (program having been authenticated) into the RAM 83 (step S1-7).

Meanwhile, the CPU 111 of the station 4 first executes the BIOS stored in the ROM 112, and expands compressed data, which is incorporated into the BIOS, into the RAM 113 (step S2-1). The CPU 111 then executes the BIOS expanded into the RAM 113, and diagnoses and initializes a variety of peripheral devices.

Specifically, the CPU 111 diagnoses and initializes the image display 7 (step S2-2). In this processing, the CPU 111 transmits a request signal to the liquid crystal driving circuit 120, and determines whether or not to have received a predetermined response signal.

Next, the CPU 111 diagnoses and initializes the touch panel 35 (step S2-3). In this processing, the CPU 111 transmits a request signal to the touch panel 35, and determines whether or not to have received a predetermined response signal.

Next, the CPU 111 diagnoses and initializes the other peripheral devices connected to the CPU 111 (step S2-4). Next, the CPU 111 transmits an initial setting signal to the main control portion 80 (step S2-5). The initial setting signal is a signal indicating completion of the diagnosis and initialization of the variety of peripheral devices in the station 4.

After executing the processing of step S2-5, the CPU 111 completes the present subroutine.

The CPU 81 of the main control portion 80 receives the initial setting signal transmitted by the stations 4 in step S2-5 (step S1-8). Subsequently, the CPU 81 determines whether or not to have received the initial setting signals from all the stations 4 (step S1-9).

When determining that the initial setting signal has not been received from a certain station 4, the CPU 81 returns the processing to step S1-8. On the other hand, when determining that the initial setting signals have been received from all the stations 4, the CPU 81 completes the present subroutine.

In the above, the first embodiment has been described.

When the CPU 111, the ROM 112 and the RAM 113 of the station 4 operate together to execute the processing of step S22 in FIG. 14, the CPU 111, the ROM 112 and the RAM 113 function as the controller that executes the processing (A) and (B) in the present invention. Further, step S22 constitutes the step (A) and step (B) in the present invention.

When the CPU 81, the ROM 82 and the RAM 83 operate together to execute the processing of step S106 in FIG. 12, the CPU 81, the ROM 82 and the RAM 83 of the main control portion 80 function as the controller that executes the processing (C) in the present invention. Further, step S106 corresponds to the step (C) in the present invention.

When the CPU 81, the ROM 82, the RAM 83 of the main control section 80 and the CPU 111, the ROM 112, and the RAM 113 of the station 4 operate together to execute the following processing, the CPU 81, the ROM 82, the RAM 83, the CPU 111, the ROM 112, and the RAM 113 function as the controller that executes the processing (D) in the present invention. Further, the following steps constitute the step (D) in the present invention:

(i) Step S107 and step S108 of FIG. 12

(ii) Paying out of game media corresponding to main-game payout amounts in step S30 and step S31 of FIG. 14

When the CPU 81, the ROM 82, the RAM 83 of the main control portion 80 and the CPU 111, the ROM 112, and the RAM 113 of the station 4 operate together to execute the following processing, the CPU 81, the ROM 82, the RAM 83, the CPU 111, the ROM 112, and the RAM 113 function as the controller that executes the processing (E) in the present invention. Further, the following step constitutes the step (E) in the present invention:

(i) Step S111 and step S112 of FIG. 12

(ii) Paying out of game media corresponding to side-game payout amounts in step S29 and step S30 of FIG. 14, and paying out of game media corresponding to main-game payout amounts in step S49 and step S50 of FIG. 15.

In the first embodiment, the free game is generated when the color combination has resulted in the predetermined combination (RED, RED, RED). However, the bonus game in the present invention is not limited to this example. For example, a game may be played in which the BET needs to be placed like in the normal game, but high payouts (odds) are set as compared with those in the normal game. In this case, the gaming machine may be configured such that the larger the number of game media are BET as the normal BET in the normal game which triggers generation of the bonus game, the higher the odds in the bonus game become. Further, a game different from the dice game (e.g. card game such as poker) may be played.

Moreover, these games may be played just once or repeatedly played a plurality of times. In the case of repeatedly playing games a plurality of times, the number of bonus games may be determined based upon the number of game media having been BET as the normal BET like in the first embodiment, or the number of bonus games may be determined based upon the number of game media having been BET as the side BET. Further, the number of bonus games may be determined based upon the main-game payout amount. Further, a plurality of predetermined conditions may be set, and the number of bonus games may be varied for each predetermined condition.

In the first embodiment, the stopping plate 100 is provided with the partition plates 101 capable of preventing the dice from stopping on the boundary portions of the adjacent regions out of the stopping plates 100A to 100F constituting the stopping plate 100. However, in the present invention, the partition plates may not be provided. In this case, it could happen that the die stops on the boundary portion between the adjacent regions. For example, when the die stops on the boundary portion between the region colored yellow and the region colored red, both the side BET on yellow and the side BET on red may be considered as a win. Further, the gaming machine may be configured such that the color of the region having a wider area out of the regions in contact with the die may be identified.

In the first embodiment, the case has been described where the larger the number of game media have been BET as the normal BET, the larger number of game media are paid out as the side-game payout. As thus described, in the present invention, it is possible to adopt the configuration in which the amount of game media that are paid out as the additional payout increases based upon the amount of the game media having been BET as the normal BET. It should be noted that, in the present invention, the manner of offering the additional payout based upon the amount of game media having been BET as the normal BET is not limited to this example. For example, the gaming machine may be configured such that, when there exist a plurality of players who have placed the side BETs on the combination of the colors of the regions to which the stopped dice belong (namely, the players whose side BETs has resulted in wins), a player having placed the normal BET with the largest amount of game media can acquire the additional payout.

According to the gaming machine 1 of the first embodiment, two kinds of BETs, which are the normal BET and the side BET, can be placed. When the side BET is placed, not only the normal payout based upon the normal BET but also the additional payout based upon the side BET can be offered. It is thereby possible to increase options in BETTING so that a game in which the player hardly feels bored can be provided.

Further, according to the gaming machine 1 of the first embodiment, the stopping plate 100 where the dice stop includes a plurality of regions each having a different color from one another. Based upon the colors of the regions to which the stopped dice belong and the side BET, the additional payout is offered. In this manner, since the colors of the regions to which the stopped dice belong are involved in the payout as well as the outcomes of the dice, it is possible to make the player interested in such colors as well as the outcomes of the dice. Thereby, an increase in matters of concern for the player can reduce the possibility that the player feels the game is monotonous. It is thereby possible to provide a game in which the player hardly feels bored even when the player plays the games for a long period of time.

Moreover, the additional payout is offered based upon the colors of the regions to which the stopped dice belong. Generally, colors are easily visually recognizable by human eyes, and hence there is a high possibility that the player grasps the colors of the regions to which the stopped dice belong more easily than grasping the outcomes of the stopped dice. Consequently, the player can relatively easily recognize whether or not the additional payout is to be offered and whether the payout amount is large or small. It is thus possible to avoid a situation in which the player cannot feel interested in the game due to the difficulty of immediate recognition of whether his or her BET has resulted in a win or a loss.

Furthermore, it is possible to allow the player to visually enjoy the positional relationships between the dice that are about to stop and the stopping plate 100 having a variety of colors, so as to also improve the interesting aspect of the game.

According to the gaming machine 1 of the first embodiment, the additional payout is offered, on condition that the input indicating placement of the normal BET on the outcomes of the stopped dice has been made, namely when the normal BET has resulted in a win. Therefore, with the normal BET resulting in a win, the joy of the player having been able to acquire the normal payout can be increased. It is thereby possible to provide the player with a high sense of satisfaction.

Further, according to the gaming machine 1 of the first embodiment, the larger the number of game media placed as the normal BET, the larger number of game media are paid as the additional payout. It is therefore possible to prompt the player to place the normal BET with a large number of game media, thereby benefit of a game parlor can be increased.

Further, since there is a correlation between the number of game media which have been BET as the normal BET and the number of game media that can be paid out as the additional payout, this configuration allows the player to consider how to place the BET while thinking the correlation of the both, upon placement of the normal BET and the side BET. Namely, it is possible to make the player study by trial and error such a way for placing the BET as to maximize a total of the number of game media that are paid out as the normal payout and the number of game media that are paid out as the additional payout. It is thereby possible to make the player absorbed in the games and also aware of strategic properties of the game, so as to improve the interesting aspect of the game.

According to the gaming machine 1 of the first embodiment, since free games are started when the colors of the regions to which the stopped dice belong satisfy the predetermined condition (the color combination has resulted in the combination (RED, RED, RED)), it is possible to make the player have a keen interest in that the color combination results in the combination (RED, RED, RED). This configuration allows the player to play the game while expecting that the color combination results in the combination (RED, RED, RED), so as to provide a game in which the player hardly feels bored even when the player plays games for a long period of time.

Moreover, the number of game media to be paid out as the additional payout is determined based upon the result of the bonus game. Namely, the number of game media to be paid out as the additional payout is not a predetermined number, but can vary depending upon the result of the bonus game. Hence, the player can acquire a great number of game media as the additional payout depending upon the result of the bonus game. It is thereby possible to raise the expectation of the player for the additional payout.

Moreover, according to the gaming machine 1 of the first embodiment, for enjoying the benefit of the free game, it is necessary that the side BET has been placed on the combination (RED, RED, RED) in the game which has resulted in the color combination (RED, RED, RED). It is thus possible to prompt the player to place the side BET on the combination (RED, RED, RED), and also provide the player who has placed the side BET on the combination (RED, RED, RED) with a sense of superiority and a sense of satisfaction since only such a player can enjoy the benefit of the free game.

Furthermore, according to the gaming machine 1 of the first embodiment, during the free game, the player can place the normal BET on the any outcomes of the dice with the game media in the same number as the number of game media having been BET as the normal BET in the normal game having triggered generation of the free game (the normal game which has resulted in the color combination (RED, RED, RED)), without reducing the number of credits. Further, in a case where the side BET is placed on the combination (RED, RED, RED) during the free game, when the combination of the colors determined by the stopped dice results in the combination (RED, RED, RED), the number of remaining free games increases by the number of C, which is a number determined based upon the number of game media having been BET as the normal BET in the normal game having triggered generation of the free game (the normal game which has resulted in the color combination (RED, RED, RED)). As thus described, the larger the number of game media have been BET as the normal BET in the normal game having triggered generation of the free game, the larger the number of game media can be BET as the normal BET without reduction in number of credits during the free game, and the larger the number of free games increases in the case where the color combination results in the combination (RED, RED, RED) during the free game. Hence it is possible to prompt the player to place the normal BET with a large number of game media. Furthermore, since the player does not know when a game which results in the color combination (RED, RED, RED) is generated, it is possible to prompt the player to place the normal BET with a large amount of game media in every game. Therefore, it is possible to increase benefit of a game parlor, and to significantly increase pleasure of the player upon generation of the free game.

Second Embodiment

In the first embodiment, it has been described that the side-game payout is offered on condition that the normal BET has been placed on the outcomes of the dice determined by the stopped dice, namely that the main-game payout amount is not 0 (the result of the main game is a win). As thus described, in the present invention, whether or not to offer the side-game payout may be determined based upon the main-game payout amount.

In the second embodiment, a case will be described where the side-game payout is offered on condition that the normal BET has not been placed on the outcomes of the dice determined by the stopped dice, namely that the main-game payout amount is 0 (the result of the main game is a loss).

In the following description, the same constituents as those of the gaming machine 1 according to the first embodiment are provided with the same numerals.

Further, the parts of the second embodiment to which description on the first embodiment can be applied will not be described.

Figure 17:
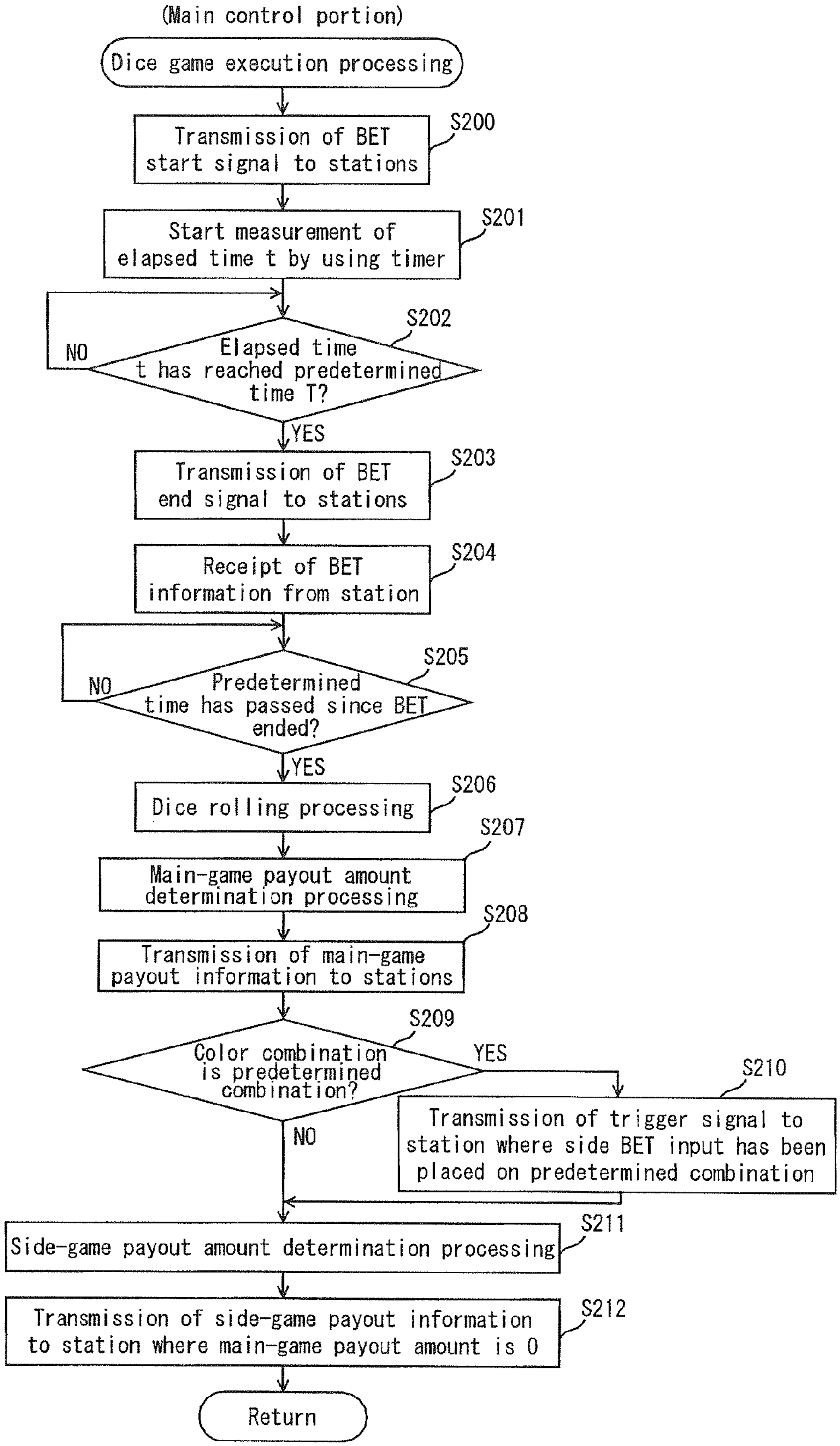
FIG. 17 is a flowchart showing a subroutine of dice game execution processing that is performed in a main control portion according a second embodiment.

FIG. 17 is a flowchart showing a subroutine of the dice game execution processing that is performed in the main control portion according to the second embodiment.

Although the CPU 81 first executes processing of step S200 to step S211, a description thereof is omitted here since the processing is the same as that of step S100 to step S111 in FIG. 12.

In step S212, the CPU 81 transmits the side-game payout information indicating the side-game payout amount determined in step S211 to the station 4 where the main-game payout amount decided in step S207 is 0.

In the second embodiment, in step S211, the side-game payout amounts in all the stations 4 are determined. However, in the present invention, only the side-game payout amount in the station where the main-game payout amount is 0 may be determined.

After executing the processing of step S212, the CPU 81 completes the present subroutine.

In the above, according to the gaming machine 1 of the second embodiment, the additional payout is offered on condition that the input indicating placement of the normal BET on the outcomes of the stopped dice has not been made, namely when the normal BET has resulted in a loss. Thereby, it is possible to provide the player who may feel disappointed by the loss of the normal BET with a sense of satisfaction. Moreover, it is possible to prevent the player from being tired of the games due to continuous loss of the normal BET for a long period of time.

In the above, in the first embodiment and the second embodiment (the present embodiments), the cases have been described where whether or not to offer the side-game payout is determined in accordance with whether or not the main-game payout amount is 0. However, in the present invention, the gaming machine is configured such that whether or not the side-game payout amount is large or small is determined based upon whether or not the main-game payout amount is large or small.

Although the case has been described in the present embodiments where the real dice 70 roll in the gaming portion 3, a configuration may be employed in the present invention in which a main image display is installed separately from the image display provided in the station and an image showing the state of rolling of the dice is displayed to the main image display, without using real dice.

In this case, the CPU 81 is connected, through the I/O interface 90, with a random number generator 130B and a liquid crystal driving circuit 120B equivalent to the liquid crystal driving circuit 120 provided in the station 4. Further, the CPU 81 is connected with a main image display 701 through the liquid crystal driving circuit 120B.

The CPU 81 determines the outcome of each of the dice 70 by means of a random number. The CPU then displays an image showing the state of rolling of the dice 70 to the main image display 701. The CPU 81 further displays an image showing the dice 70 in a state of stopping with the outcomes of the determined value to the main image display 701.

Although the embodiments of the present invention in which the real dice 70 rotate in the gaming portion 3 has been described in the above, the present invention may also include a configuration in which the real dice are not used but an image showing dice in a state of rolling is displayed to the image display in the station.

In this case, the CPU is connected to a random number generator 130B through the I/O interface 90.

The CPU 81 determines the outcome of each of the dice 70 by means of a random number, and transmits information on the determined value of the outcome of each of the dice 70 to each station 4. Each station 4 then displays an image showing the dice 70 in a state of rolling to the image display 7. Further, an image showing the dice 70 in a state of stopping is displayed to the image display 7 based upon the received information on the value of the outcome of each of the dice 70.

Although the case has been described in the present embodiments where the image display is not installed in any place other than the station 4, a configuration may be employed in the present invention in which the main image display is installed in the gaming machine separately from the image display provided in the station and an image showing the state of rolling of the dice in the gaming portion is displayed to the main image display.

In this case, the CPU 81 is connected, through the I/O interface 90, with a dice photographing device 701 having a CCD camera 17B and the liquid crystal driving circuit 120B equivalent to the liquid crystal driving circuit 120 provided in the station 4. Further, the CPU 81 is connected with the dice photographing device 701 through the liquid crystal driving circuit 120B. The CCD camera 17B provided in the dice photographing device 701 is installed at an angle that allows photographing of the gaming portion 3.

The CPU 81 displays an image showing the state of rolling of the dice 70 in the gaming portion 3 to the main image display 701, based on the signal transmitted from the dice photographing device 701.

Although the case has been described in the present embodiments where the image of the dice 70 is not displayed to the image display 7 in the station 4, the present invention may also include a configuration in which an image showing the dice in a state of rolling in the gaming portion is displayed to the image display in the station.

In this case, the CPU 81 is connected to a dice photographing device 701 equipped with a CCD camera 17B through the I/O interface 90. The CCD camera 17B in the dice photographing device 701 is installed at such an angle as to be able to photograph the gaming portion 3.

The CPU 81 transmits a signal transmitted from the dice photographing device 701 to each station. The CPU 111 then displays to the image display 7 an image showing the dice 70 in a state of rolling in the gaming portion 3 based upon the signal received from the main control portion 80.

Although the case has been described in the present embodiments where the outcomes of the dice 70 and the colors of the stopping plate 100 (the stopping plates 100A to 100F) where the dice 70 have stopped are detected using the CCD camera 17, the method for detecting the outcomes of the dice and the colors of the stopping plate 100 (the stopping plates 100A to 100F) where the dice 70 have stopped is not particularly limited in the present invention. For example, an identifiable device, such as a device reactive to magnetism, may be previously imbedded inside each of the dice, and its outcome may be detected by the use of a magnetic change in the device. Moreover, an optical sensor may be used to detect the outcomes of the dice and the colors of the stopping plate 100 (the stopping plates 100A to 100F) where the dice 70 have stopped.

Although the case has been described in the present embodiments where the dice 70 are rolled using the rotating-plate driving motor 300A, the stopping-plate driving motor 300B and the carriage driving motor 300C, the method for rolling the dice is not particularly limited; for example, a configuration may be employed in which the dice are rolled on a vibration plate. Further, the dice may not be collected, but may be in a constantly exposed state inside the gaming portion.

Although the case has been described in the present embodiments where the number of the dice 70 is three, the number of die is not limited in the present invention, and for example, the number of die may be five.

Although the case has been described in the present embodiments where the controller in the present invention includes the CPU 81 provided in the main control portion 80 and the CPU 111 provided in the station 4, the controller in the present invention may be configured by a single CPU.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step has been described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming machine, comprising:

a gaming region, which includes a plurality of regions each having a different color from one another and in which dice roll and stop;

an input device with which a normal bet can be placed on outcomes of the dice and a side bet can be placed on colors of regions to which the stopped dice belong;

a controller programmed so as to execute the following processing of:

(A) accepting from said input device an input indicating placement of said normal bet on the outcomes of said dice;

(B) accepting from said input device an input indicating placement of said side bet on the colors of the regions to which stopped dice belong;

(C) rolling and stopping said dice in said gaming region;

(D) offering a normal payout based upon the outcomes of the dice stopped in said processing (C) and the normal bet placed in said processing (A); and (E) offering a payout based upon the colors of the regions to which the dice stopped in said processing (C) belong and the side bet placed in said processing (B).

2. The gaming machine according to claim 1, wherein said processing (E) is processing of offering the payout based upon the colors of the regions to which the dice stopped in said processing (C) belong and the side bet placed in said processing (B), on condition that the input indicating placement of the normal bet on the outcomes of the dice stopped in said processing (C) has been made in said processing (A).

3. The gaming machine according to claim 1, wherein said processing (E) is processing of offering the payout based upon the colors of the regions to which the dice stopped in said processing (C) belong and the side bet placed in said processing (B), on condition that the input indicating placement of the normal bet on the outcomes of the dice stopped in said processing (C) has not been made in said processing (A).

4. The gaming machine according to claim 1, wherein said processing (E) is processing of offering the payout based upon an amount of game media BET in said processing (A) as the normal bet, the colors of the regions to which the dice stopped in said processing (C) belong, and the side bet placed in said processing (B).

5. The gaming machine according to claim 1 wherein said processing (E) is processing of executing a bonus game as a game that is started when the colors of the regions to which the dice stopped in said processing (C) belong satisfy a predetermined condition, and offering the payout based upon a game result determined in said bonus game.

6. A method for controlling a gaming machine including a programmable controller, the method comprising the steps of:

with the programmable controller:

(A) accepting from an input device an input indicating placement of a normal bet on outcome of dice;

(B) accepting from the input device an input indicating placement of a side bet on colors of regions to which stopped dice belong;

(C) rolling and stopping said dice in a gaming region which includes a plurality of regions each having a different color from one another;

(D) offering a normal payout based upon the outcome of the dice stopped in said step (C) and the normal bet placed in said step (A); and (E) offering a payout based upon the colors of the regions to which the dice stopped in said step (C) belong and the side bet placed in said step (B).

* * * * *